(12) United States Patent
Kitamura et al.

(10) Patent No.: US 6,907,498 B2
(45) Date of Patent: *Jun. 14, 2005

(54) COMPUTER SYSTEM AND A METHOD OF ASSIGNING A STORAGE DEVICE TO A COMPUTER

(75) Inventors: Manabu Kitamura, Yokohama (JP); Kenji Yamagami, Los Gatos, CA (US); Tatsuya Murakami, Odawara (JP)

(73) Assignee: Hitachi, Ltd., Tokyo (JP)

(*) Notice: Subject to any disclaimer, the term of this patent is extended or adjusted under 35 U.S.C. 154(b) by 269 days.

This patent is subject to a terminal disclaimer.

(21) Appl. No.: 10/095,582

(22) Filed: Mar. 13, 2002

(65) Prior Publication Data

US 2002/0091828 A1 Jul. 11, 2002

Related U.S. Application Data

(62) Division of application No. 09/642,817, filed on Aug. 22, 2000.

(30) Foreign Application Priority Data

Aug. 27, 1999 (JP) .......................................... 11-241024

(51) Int. Cl.[7] .............................................. G06F 12/00
(52) U.S. Cl. ...................................... 711/112; 711/152
(58) Field of Search ................................ 711/114, 152, 711/153, 156; 707/200; 709/223

(56) References Cited

U.S. PATENT DOCUMENTS

| 4,310,833 A | 1/1982 | Sakaguchi ................... 707/205 |
|---|---|---|
| 4,607,346 A | * 8/1986 | Hill .............................. 711/170 |
| 4,771,375 A | 9/1988 | Beglin et al. ................ 711/111 |
| 5,018,060 A | 5/1991 | Gelb et al. ................... 707/205 |
| 5,619,690 A | * 4/1997 | Matsumani et al. ......... 707/200 |

(Continued)

FOREIGN PATENT DOCUMENTS

JP 10-333839 12/1998

*Primary Examiner*—Nasser Moazzami
(74) *Attorney, Agent, or Firm*—Mattingly, Stanger, Malur & Brundidge, P.C.

(57) ABSTRACT

A computer system which has a plurality of computers and a storage device subsystem connected to the plurality of computers. The storage device subsystem has a plurality of storage devices and a plurality of interfaces, through which the subsystem is connected to the computers. One of the plurality of computers has a management means for holding therein data indicative of the storage devices and a connection relationship between the computers and storage device subsystem. Each computer, when wanting a new device, informs the management means of its capacity and type. The management means receives its notification and selects one of the storage devices which satisfies the request. And the management means instructs the storage device subsystem to set predetermined data in such a manner that the computer can access the selected device. The management means also returns predetermined data to the computer as a device assignment requester, the assignment requester computer modifies setting thereof to allow the computer in question can use the assigned device.

18 Claims, 23 Drawing Sheets

U.S. PATENT DOCUMENTS

| | | | | |
|---|---|---|---|---|
| 5,758,050 A | | 5/1998 | Brady et al. .................... | 714/1 |
| 5,903,913 A | * | 5/1999 | Ofer et al. .................... | 711/156 |
| 5,956,750 A | | 9/1999 | Yamamoto et al. ......... | 711/167 |
| 6,044,442 A | * | 3/2000 | Jesionowski ................ | 711/153 |
| 6,098,128 A | | 8/2000 | Velez-McCaskey et al. .. | 710/65 |
| 6,192,454 B1 | | 2/2001 | DeVos ........................ | 711/154 |
| 6,209,024 B1 | | 3/2001 | Armstrong et al. ......... | 709/212 |
| 6,230,247 B1 | | 5/2001 | Cannon et al. ............. | 711/171 |
| 6,236,350 B1 | | 5/2001 | Andrews .................... | 341/176 |
| 6,253,240 B1 | | 6/2001 | Axberg et al. .............. | 709/223 |
| 6,260,120 B1 | * | 7/2001 | Blumenau et al. .......... | 711/152 |
| 6,279,040 B1 | | 8/2001 | Ma et al. .................... | 709/231 |
| 6,356,985 B1 | | 3/2002 | Ichimi et al. ............... | 711/154 |
| 6,389,432 B1 | | 5/2002 | Pothapragada et al. ..... | 707/205 |
| 6,484,160 B1 | | 11/2002 | Richard et al. ................ | 707/2 |
| 6,484,245 B1 | | 11/2002 | Sanada et al. ............... | 711/164 |
| 6,502,136 B1 | | 12/2002 | Higuchi et al. ............. | 709/226 |
| 6,519,471 B1 | | 2/2003 | Yamaguchi .................. | 455/517 |
| 6,529,996 B1 | | 3/2003 | Nguyen et al. ............. | 711/114 |
| 6,542,962 B2 | * | 4/2003 | Kodama et al. ............ | 711/114 |
| 6,553,401 B1 | | 4/2003 | Carter et al. ................ | 709/200 |
| 6,597,956 B1 | | 7/2003 | Aziz et al. .................... | 700/3 |
| 6,640,278 B1 | | 10/2003 | Nolan et al. .................... | 711/6 |
| 6,654,830 B1 | | 11/2003 | Taylor et al. ................. | 710/74 |
| 6,665,709 B1 | | 12/2003 | Barron ....................... | 709/217 |
| 2001/0056480 A1 | | 12/2001 | Taylor et al. ............... | 709/219 |
| 2002/0152364 A1 | | 10/2002 | Gunaseelan et al. ........ | 711/170 |
| 2002/0162047 A1 | | 10/2002 | Peters et al. .................. | 714/5 |
| 2003/0177162 A1 | | 9/2003 | Staiger et al. .............. | 718/102 |

\* cited by examiner

FIG. 2

| LOGICAL DEVICE NUMBER | SIZE | CONFIGURATION | STATE | PATH | TARGET ID | LUN |
|---|---|---|---|---|---|---|
| 0 | 1000000 | RAID1 | ONLINE | 0 | 0 | 0 |
| 1 | 1000000 | RAID5 | ONLINE | 1 | 1 | 1 |
| 2 | 35000 | CACHE | ONLINE | 0 | 0 | 2 |
| 2 | 35000 | CACHE | ONLINE | 1 | 0 | 0 |
| ....... | ....... | ....... | ....... | ....... | ....... | ....... |
| k | — | — | NOT MOUNTED | — | — | — |
| k+1 | 1000000 | SINGLE DISK | OFFLINE TROUBLE | 0 | 1 | 0 |
| k+2 | 1000000 | RAID1 | OFFLINE | — | — | 1 |
| n | — | — | NOT MOUNTED | — | — | — |

| HOST COMPUTER NAME | PORT NUMBER | INTERFACE NUMBER | LOGICAL DEVICE NUMBER |
|---|---|---|---|
| HOST 1 | 0 | 0 | 0,1 |
| HOST 2 | 1 | 0 | 1 |
| HOST 2 | 2 | 1 | 3 |
| ⋮ | ⋮ | | |
| HOST N | 0 | 0 | n |

| DEVICE NUMBER | WWN | SIZE | CONFIGURATION | STATE | LUN | CONNECTING HOST NAME |
|---|---|---|---|---|---|---|
| 101 | 102 | 103 | 104 | 105 | 106 | 107 |
| 0 | xxxxxx | 1000000 | RAID 1 | ONLINE | 0 | HOST A |
| 1 | xxxxxx | 1000000 | RAID 5 | OFFLINE | - | |
| 2 | xxxxxx | 35000 | CACHE | ONLINE | 2 | HOST A, HOST B |
| ....... | ....... | ....... | ....... | ....... | ....... | ....... |
| n | xxxxxx | 1000000 | SINGLE DISK | OFFLINE TROUBLE | 0 | |

FIG. 20

| | 151 | 152 | 153 | 154 | 155 |
|---|---|---|---|---|---|
| | LVOL NAME | DEVICE FILE | SIZE | WWN | LUN |
| | lvol1 | /dev/rdsk/c0t0d0 | 1000000 | XXXX | 0 |
| | lvol2 | /dev/rdsk/c0t0d1 | 500000 | XXXX | 1 |
| | lvol3 | /dev/rdsk/c1t0d0<br>/dev/rdsk/c1t0d1 | 35000<br>500000 | XXXX<br>XXXX | 0<br>1 |
| | ⋮ | ⋮ | ⋮ | ⋮ | ⋮ |
| | lvolN | | | XXX | n |

FIG. 22

| CLUSTER NUMBER (161) | PORT NUMBER (162) | WWN (163) |
|---|---|---|
| 1 | 1 | xxxx |
|   | 2 | xxxx |
| 2 | 3 | xxxx |
| 3 | 4 |   |
|   | 5 |   |
| ⋮ | ⋮ | ⋮ |
| N |   | xxxx |

COMPUTER SYSTEM AND A METHOD OF ASSIGNING A STORAGE DEVICE TO A COMPUTER

This is a continuation application of U.S. Ser. No. 09/642,817, filed Aug. 22, 2000.

BACKGROUND OF THE INVENTION

The present invention relates to a computer system and a method for assigning a storage device to the computer system and more particularly, to a method for assigning a storage device to a computer in a computer system including a storage subsystem having a fibre channel interface.

As the amount of information treated in a computer system for use in companies, corporations, etc. is drastically increased, the capacity of a storage device such as a disk for storage of data has been increased steadily in these years. For example, a magnetic disk storage system having a capacity of the order of terabytes is very common. With respect to such a disk storage system, there is a technique by which a single storage device subsystem is made up of a plurality of types of logical disks (which will be sometimes referred to merely as disks), e.g., as disclosed in U.S. Pat. No. 5,956,750. Disclosed in the disclosure is, more specifically, a disk subsystem which is made up of disks having different RAID levels such as RAID5 and RAID1 as devices (logical disks) to be accessed by a host computer, or made up of disks having different access rates as actual magnetic disks (physical disks) of logical disks. A user can selectively use the devices according to the access rates of the respective devices.

Appearance of a fibre channel technique as an interface between a host computer and a peripheral device such as a disk has also led to the fact that a plurality of host computers and a plurality of storage devices are connected by a single fibre channel cable to form a computer system. In such a computer system, each of the host computers can directly access any of the storage devices on the fibre channel. For this reason, the computer system can be expected to share data with the respective host computers and to reduce the load of a network, when compared with the prior art wherein each of the host computers has a storage device.

SUMMARY OF THE INVENTION

In the aforementioned prior art, the numbers and types of devices accessible by each host computer can be remarkably increased. However, as the numbers and types of devices accessible by each host computer is increased, it has been difficult to control the devices by each host computer. This system is advantageous in that many devices can be accessed by a single host computer, but is disadvantageous in that it is difficult for the user to select suitable one of the devices which is to be used for a given business. In particular, in the case of a computer system wherein the host computers and devices connected by fibre channels, one of the host computers can access even one of the devices which is not initially intended to be used by the host computer in question. For this reason, the host computer may make unauthorized access to the device being used by the other host computer, thus leading to data destruction of the device.

In order to solve such a problem, there is disclosed in JP-A-10-333839 a method by which storage devices connected by fibre channels can be accessed only by a specific host computer. However, when a plurality of storage devices (or devices) are used or when different types of devices are mixedly used, its processing becomes still complex and each host computer must always take the types of the devices into consideration.

It is therefore an object of the present invention to facilitate setting of devices and assignment of the devices to host computers such that each of the host computers can use necessary one of the devices confirming to its application at a required time for a required time.

In a preferred embodiment of the present invention, a computer system has a plurality of computers and a storage device subsystem connected to the plurality of computers. The storage device subsystem, which has a plurality of storage devices and a plurality of interfaces, is connected to the computers. One of the computers has a management means for holding therein data about the storage devices within the storage device subsystem and about a connection relationship between the computers and storage device subsystem. Each computer, when wishes to form a new device, informs the management means of its capacity and type. The management means, when informed by the computer, selects one of the storage devices satisfying its request. And the management means instructs the storage device subsystem to set necessary data in such a manner that the request computer can access the selected device. The management means also returns necessary data to the computer as a device assignment demander, such that the computer as the requester can modify its setting based on the data and can use the assigned device.

In another embodiment of the present invention, a plurality of computers and a plurality of storage device subsystems are interconnected in a network. Any one of the computers has a management means for holding therein information of the storage devices possessed by the storage device subsystems and a connection relationship between the computers and the storage device subsystems. Each storage device subsystem has a control means for allowing access from the management means to the specified computer. Each computer, when requiring a new storage device, informs the management means of its capacity and type. The management means, when informed by the computer, instructs the storage device subsystem to allow access from the associated computer thereto, whereby the computer can selects one of the devices satisfying the request and the computer in question can access the storage device subsystem. The management means also returns predetermined data to the computer as a device assignment request computer. The computer as the device assignment request computer, on the basis of the data returned from the management means, modifies setting of the computer in such a manner that the computer can use the device assigned thereto.

Other objects and advantages of the present invention will become clear as the following description of the invention advances as detailed with reference to preferred embodiments of the invention as shown in accompanying drawings.

BRIEF DESCRIPTION OF THE DRAWINGS

FIG. 2 shows an exemplary structure of a logical device management table held in a storage device subsystem;

FIG. 3 shows an exemplary structure of a host computer management table held by a control manager;

FIG. 9 shows an exemplary structure of a logical device management table held by a control manager;

FIG. 20 shows an exemplary structure of an LVOL management table;

FIG. 22 is an exemplary structure of a cluster data table; and

DESCRIPTION OF THE EMBODIMENTS

Figure 1:
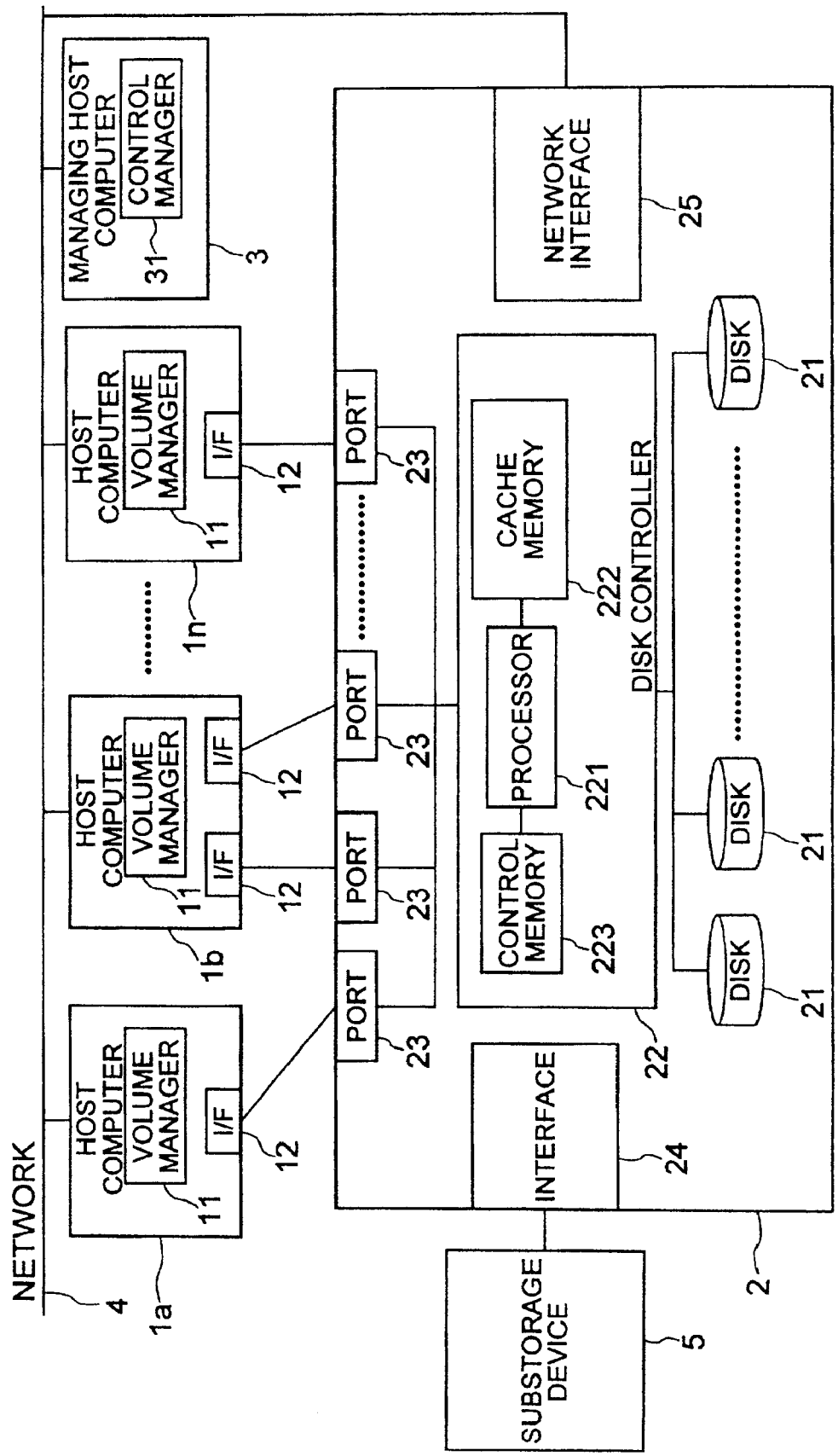
FIG. 1 is a block diagram showing an exemplary arrangement of a computer system in accordance with a first embodiment of the present invention.

FIG. 1 is a schematic block diagram showing an exemplary arrangement of a computer system in accordance with an embodiment of the present invention. The computer system includes a plurality of host computers 1a, 1b, . . . , and 1n (which will be generally denoted by a host computer 1), a storage device subsystem 2 connected to the host computer, a managing host computer 3, a network 4, and a substorage device 5.

Each of the host computers 1a, 1b, . . . , which has a CPU, a memory and so on, can perform a predetermined function by its CPU which reads out an operating system and an application program from the memory and executing them.

The storage device subsystem 2 has a plurality of disk units 21, a disk controller 22, a plurality of ports 23 connected to the host computer 1, an interface 24 for connection with the substorage device 5, and a network interface 25 for connection with the network 4. The storage device subsystem 2 in the present embodiment causes the host computer 1 to look as if there were a single or a plurality of logical devices by combining the plurality of disk units 21. Of course, the storage device subsystem 2 may cause the host computer 1 to look as if there were one logical device for each disk unit 21.

The port 23 may comprise, for example, an interface such as SCSI (Small Computer System Interface) when the host computer 1 to be connected therewith is a computer in a so-called open system. When the host computer 1 is a so-called mainframe, on the other hand, the port 23 may comprise a channel interface such as ESCON (Enterprise System Connection). The ports 23 may be an identical type interfaces or may include interfaces of different types. In the present embodiment, explanation will be made in connection with a case where the ports 23 are all an identical SCSI type of interfaces.

The disk controller 22 has a processor 221, a cache memory 222, and a control memory 223. The processor 221 controls access from the host computer 1 to the disk units 21. In particular, when the storage device subsystem 2 causes the host computer 1 to look as if the subsystem had not the single disk units 21 but a single or a plurality of logical devices corresponding to the single disk unit or a combination of the plurality of disk units as in a disk array, the processor 221 performs its operation and management. The disk controller 22 communicates with the managing host computer 3 via the network interface 25.

In order to increase an access processing rate from the host computer 1, the cache memory 222 stores data frequently read out from the host computer 1 therein or temporarily stores write data from the host computer 1 therein. When a part of the cache memory 222 is pretended as a single or a plurality of logical devices, the memory part can also be used as a device which can eliminate access to the magnetic disk unit.

The control memory 223 is used to store therein a program to be executed by the processor 221 or to store therein data for management of the logical device or devices formed as a combination or combinations of the disk units 21.

Provided in each of the host computers 1a, 1b, . . . is software called a volume manager 11. The volume manager 11 operates to communicate with a control manager 31 provided in the managing host computer 3. Each host computer 1 has an interface (I/F) 12 and is connected at its interface 12 with the associated port 23 of the storage device subsystem 2.

Explanation will next be made as to how to manage the logical devices within the storage device subsystem 2.

As has been explained earlier, the storage device subsystem 2 causes the host computer 1 to look as if the storage device subsystem 2 had a single or a plurality of logical devices corresponding to a combination or combinations of the disk units 21 or had logical devices each corresponding to each of the disk units 21. The storage device subsystem 2 also causes the host computer 1 to look as if a part of the cache memory 222 of the subsystem like a single or a plurality of logical devices. The number of disk units 21 in the storage device subsystem 2 has no correlation with the number of logical devices.

FIG. 2 is an exemplary structure of a logical device management table for holding data for management of logical devices by the storage device subsystem 2. The logical device management table holds a relationship of a set of items of size 62, configuration 63, state 64, path 65, target ID 66, and LUN 67 to a logical device number 61. Set in the item 'size' 62 is data indicative of the capacity of a logical device specified by the logical device number 61. The item 'configuration' 63 indicates data indicative of the configuration of the logical device, for example, RAID (Redundant Arrays of Inexpensive Disks) of the disk units 21. When the disk units are assigned to logical devices, the configuration item 63 sets therein data indicative of the type of the RAID such as RAID1 or RAID5. When a part of the cache memory 222 is assigned as the logical devices, the configuration item 63 sets 'cache' therein; while, when the single disk unit is assigned, the item 63 sets data indicative of the state of 'single disk unit' therein. The item 'state' 64 sets data indicative of the state of the logical devices therein. The state item has 'online', 'offline', 'not mounted', and 'offline trouble'. The 'online' indicates a state wherein the logical devices are in their normal operation and can be accessed by the host computer 1. The 'offline' indicates a state wherein the logical devices are defined and are in their normal operation, but cannot be accessed by the host computer 1. This state corresponds to a case where the logical devices have been so far used by the host computer 1 became unused because it became unused for the host computer 1 to use them. The 'not mounted' indicates a state wherein the logical devices are not defined and cannot be accessed by the host computer. The 'offline trouble' indicates a state wherein a trouble takes place in the logical devices and thus the devices cannot be accessed by the host computer. Set in the item 'path' 65 is data indicative of one of the ports 23 connected with associated one of the logical devices. A unique number in the storage device subsystem 2 is assigned to each of the ports 23, and the numbers of the ports 23 connected with the associated logical devices are recorded in the column 'path'. The target ID 66 and LUN 67 are each an identifier for discrimination between the logical devices. In this example, the SCSI-Ids and LUNs used when the devices are accessed by the host computer 1 on the SCSIs are used as these identifiers.

One logical device can be connected to a plurality of ports and a plurality of host computers 1 can access an identical logical device. In this case, the logical device management table has a plurality of entries relating to the logical device created therein. For example, in such a logical device management table as shown in FIG. 2, the device having a logical device number of 2 is connected to two ports 23 having port numbers 0 and 1. For this reason, two items of the logical device numbers of 2 are present. When a single logical device can be accessed by the plurality of ports 23 in this way, the target ID and LUNs associated with the respective paths 65 do not have to be the same respectively and may be different as shown in FIG. 2. Data described in the logical device management table are sent via the interface 24 to the managing host computer 3 at suitable timing or as when a trouble occurred in the storage device subsystem 2 to change the configuration. Thus, the managing host computer 3 also holds a logical device management table similar to the table shown in FIG. 2.

FIG. 3 is an exemplary structure of a host computer management table held by the control manager 31 of the managing host computer 3.

The host computer management table holds management data as a set of a host computer name 71, a port number 72, an interface number 73 and a logical device number 74 in order for the managing host computer 3 to manage assignment of devices to the host computers 1.

The port number 72 and logical device number 74 are numbers defined in the storage device subsystem 2 and are data for discrimination between the ports 23 and logical devices of the storage device subsystem 2. Set in the items of 'port number' 72 and 'logical device number' 74 are the number assigned to a port connected with the host computer 1 identified by an identifier set in the host computer name item 71 as well as the number or numbers assigned to logical device or devices assigned to the host computer respectively. The interface number 73 is used to manage the interface 12 of each host computer 1. The interface number 73 becomes necessary, in particular, when the single host computer 1 as a plurality of interfaces 12. A set of the port number 72 and interface number 73 is an important factor to show a connection relationship between the host computer 1 and associated logical device or devices. For example, the host computer 1b shown in FIG. 1 has two interfaces 12 which are connected to different ports 23 respectively. In such a case, even when one of such interfaces or a line connected between one interface and storage device subsystem 2 cannot be used due to occurrence of a defect therein, its processing can be continued so long as the host computer is connected at the other interface with the logical device, thus enhancing its reliability.

The managing host computer 3 assigns the logical devices to the host computers 1, by referring to its own host computer management table and the logical device management table received from the storage device subsystem 2. Explanation will then be made as to how to assign the devices.

Figure 4:
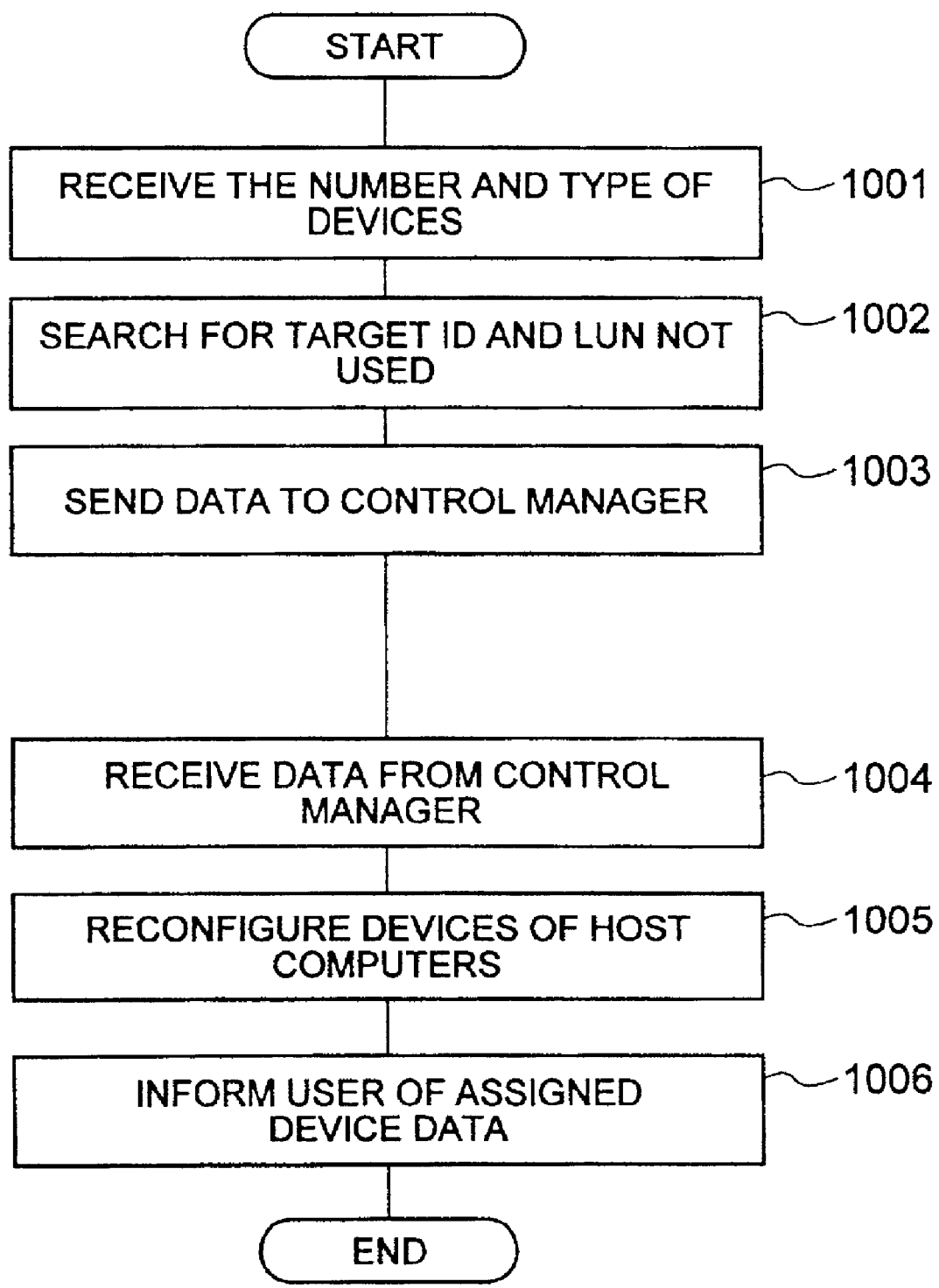
FIG. 4 is a flowchart showing a flow of operations implemented by a volume manager of a host computer.

FIG. 4 is a flowchart showing a flow of operations implemented by the volume manager 11 of each host computer 1. The operations are carried out when a user of the host computer 1 or an application program to be run on the host computer 1 requires new device or devices.

At a step 1001, the volume manager 11 obtains data on he number and type of the devices required by the user or application program. The user or application program specifies data including its capacity, performance conditions and reliability level as the device data. The term "the capacity of the device" refers to the size of the device as already explained above. The user can specify, as the performance conditions, performance data of device access rate, etc. such as, for example, low-speed disk drive high-speed disk drive, or cache residence disk drive. The user can specify, as the reliability level, device reliability data such as, for example, RAID0, RAID1, RAID5, double path or remote mirror. For the double path, when the host computer 1 has a plurality of interfaces, a plurality of paths are provided so that the host computer 1 can access an identical device utilizing the plural interfaces. For the double path, even when one of the paths cannot be used for some reason, the host computer 1 can access the device with use of the other path. The "remote mirror" means that a copy of the devices in the storage device subsystem 2 is provided to the substorage device 5. Thus, even when the storage device subsystem 2 itself cannot be operated due to factors such as earthquake or fire, the device data are held in the substorage device 5, thus enabling increase of its reliability.

At a next step 1002, the volume manager 11 searches for a set of target ID and LUN not used on the interface 12 of the host computer 1 in question.

At a step 1003, the volume manager 11 transmits the capacity, performance conditions and reliability level specified at the step 1001 as well as the set of target ID and LUN not used and searched at the step 1002 to the control manager 31 of the managing host computer 3 to request assignment of a new device. The control manager 31 searches for a device to be assigned on the basis of the received data and returns data to specify the host computer interface number, target ID and LUN to be used for device accessing. How to operate the control manager 31 in this case will be explained later.

At a step 1004, the volume manager 11 receives the data from the control manager 31. At a step 1005, the volume manager 11 modifies setting of the host computer 1 on the basis of the data received from the control processor 31 in such a manner that the host computer 1 can use a new device. In the case of a so-called open operating system, the host computer 1 makes access to each device, so that a device file is prepared for each device and its access is carried out for the device file. The device file is usually prepared when the host computer 1 underwent a device configuration operation, and no device file is created for the device which was not present during the device configuration operation. For this reason, at the step 1004, a device file for a newly assigned device is created. More specifically, in the case of a Solaris operating system or example, a command 'drvconfig' or 'drives' is used to recognize the new device and create the device file, whereby the host computer 1 can access the newly assigned device.

At a final step 1006, the volume manager 11 informs the user or application program of data about the assigned device file name, target ID and LUN, thus terminating its operation.

Figure 5:
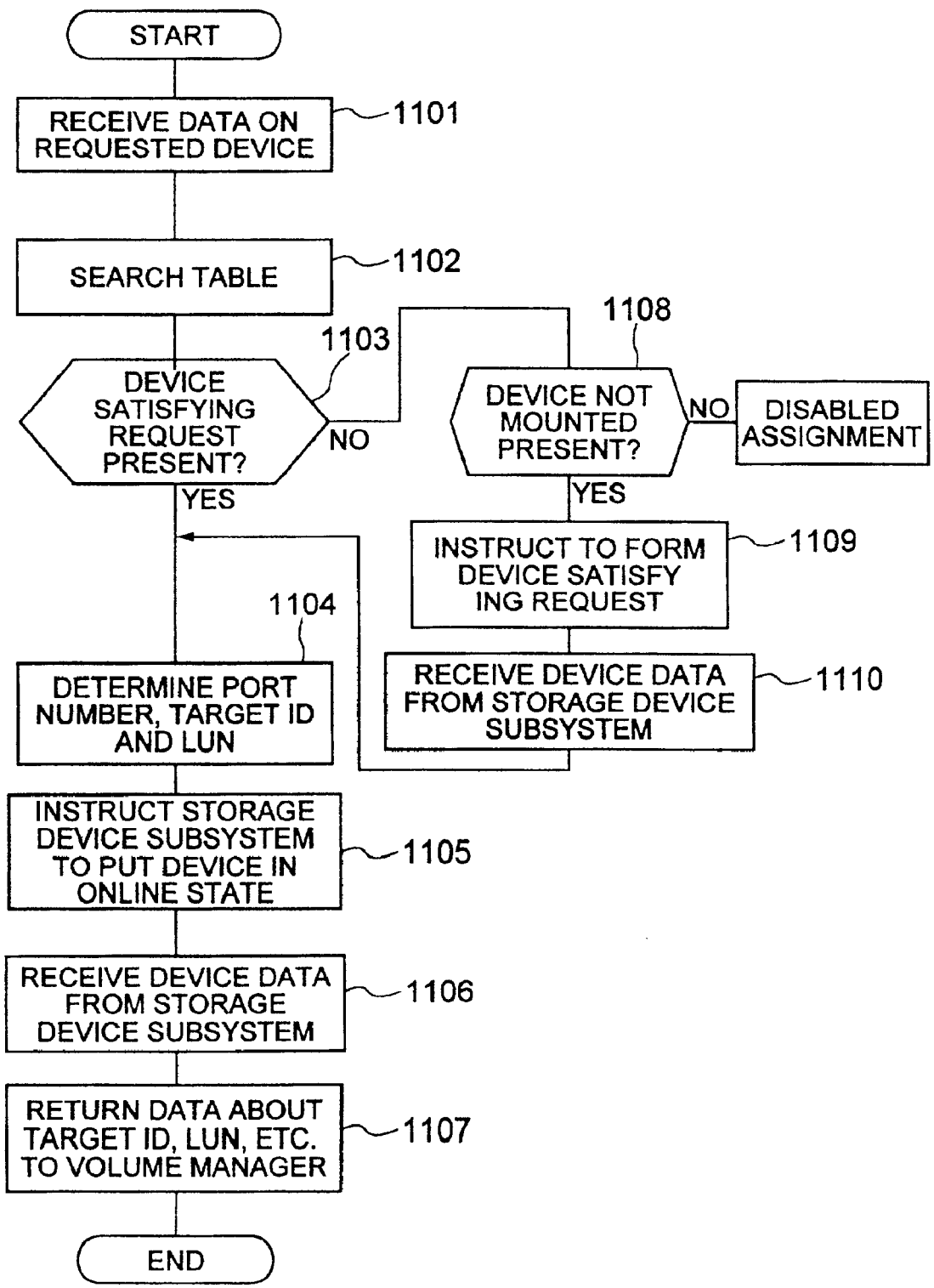
FIG. 5 is a flowchart showing a flow of operations implemented by the control manager.

FIG. 5 is a flowchart showing a flow of operations carried out by the control manager 31 of the managing host computer 3 during assignment of the new device.

At a step 1101, the control manager 31, when receiving the data about the device size, performance conditions and reliability level from the host computer 1, searches for the device satisfying the request by referring to its own logical device management table and host computer management table. In this example, the device to be searched for is denoted in the state item 64 of the logical device management table as the 'offline' (step 1102). The control manager 31, on the basis of its search result, judges the presence or absence of the device of the 'offline' state satisfying the request (step 1103).

When finding the device of the 'offline' state satisfying the request, the control manager 31 determines a port number, target ID and LUN for connection of the device to the host computer 1, on the basis of the target ID and LUN received from the host computer 1 as well as data set in the logical device management table and has computer management table (step 1104).

Subsequently the control manager 31 sets the device of the logical device number found at the step 1103 to allow the host computer 1 to be able to access the device with the port number, target ID and LUN determined at the step 1104, and instructs the storage device subsystem 2 to put its state in 'online'. The storage device subsystem 2 performs setting operations according to the instruction from the control manager 31, and returns its result to the control manager 31 (step 1105).

The control manager 31, when receiving the result from the storage device subsystem 2 (step 1106), returns the interface number, target ID and LUN to the volume manager 11 of the host computer 1 as the request demander (step 1107).

When failing to find a device of the 'offline' state satisfying the request at the step 1103, on the other hand, the control manager 31 searches for the presence of a logical device number having the 'not mounted' set in state item 64 of the logical device management table (step 1108). The presence of a logical device number having the 'not mounted' causes the control manager 31 to inform of the storage device subsystem 2 of data about the device size, performance conditions and reliability level requested by the host computer 1 and to require the storage device subsystem 2 to form the device. The storage device subsystem 2, in response to the request from the control manager 31, forms the device having the device number and returns its result to the control manager 31 (step 1109). The control manager 31, when receiving the result from the subsystem 2, executes the operations of the above step 1104 and subsequent steps (step 1110).

Figure 6:
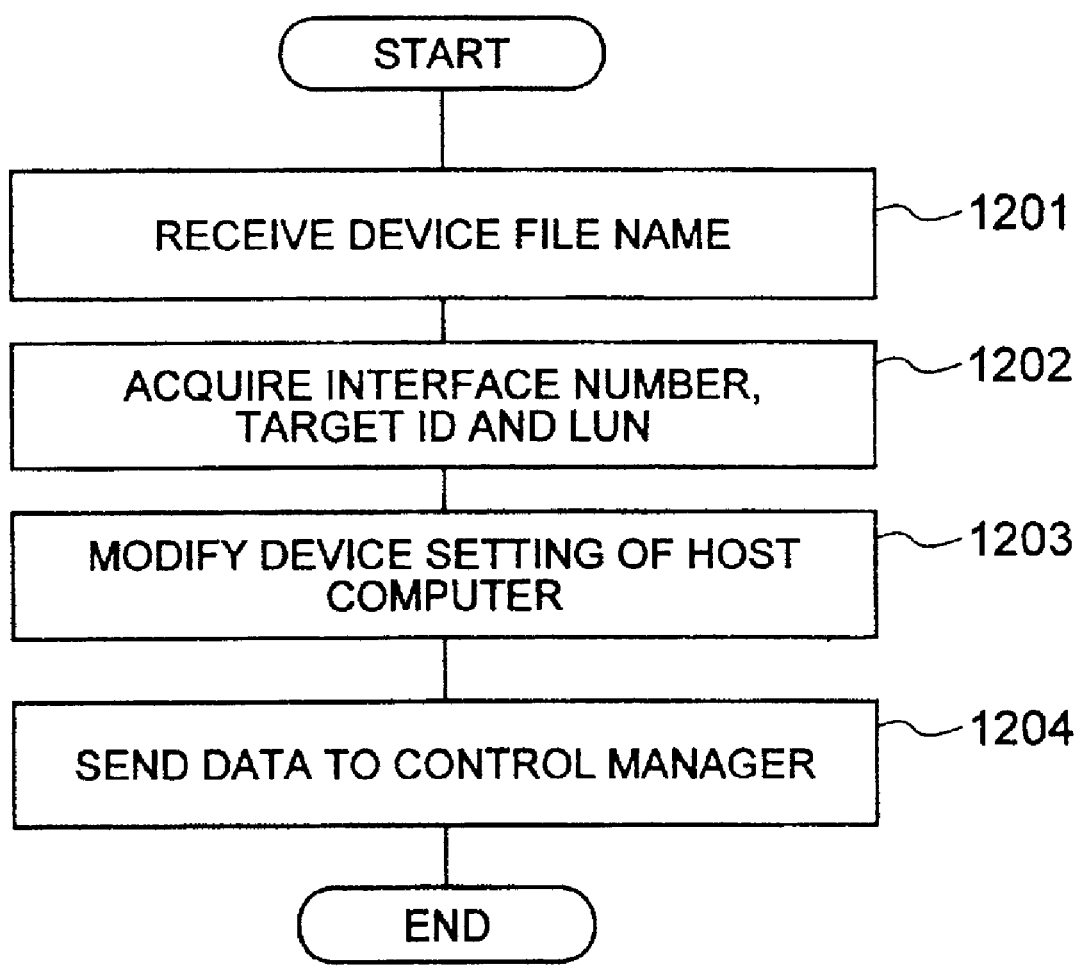
FIG. 6 is a flowchart showing a flow of operations implemented by a volume manager in a device returning process.

FIG. 6 is a flowchart showing a flow of operations to be carried out by the volume manager 11 in an unnecessary-device returning process of the host computer 1.

In the device returning process, the volume manager 11 first receives data about the device which became unnecessary, e.g., its device file name from the user or an upper-level application program (step 1201). The volume manager 11, on the basis of the received data, acquires the interface number, target ID and LUN associated with the device to be returned (step 1202). The volume manager 11 next modifies the setting of the host computer 1 as necessary in order to avoid the use of the device by the host computer 1. More specifically, in this example, the volume manager 11 performs operations such as deleting of the device file (step 1203). Subsequently, the volume manager 11 informs the control manager 31 of the interface number, target ID and LUN acquired at the step 1202, thus terminating its operation (step 1204).

Figure 7:
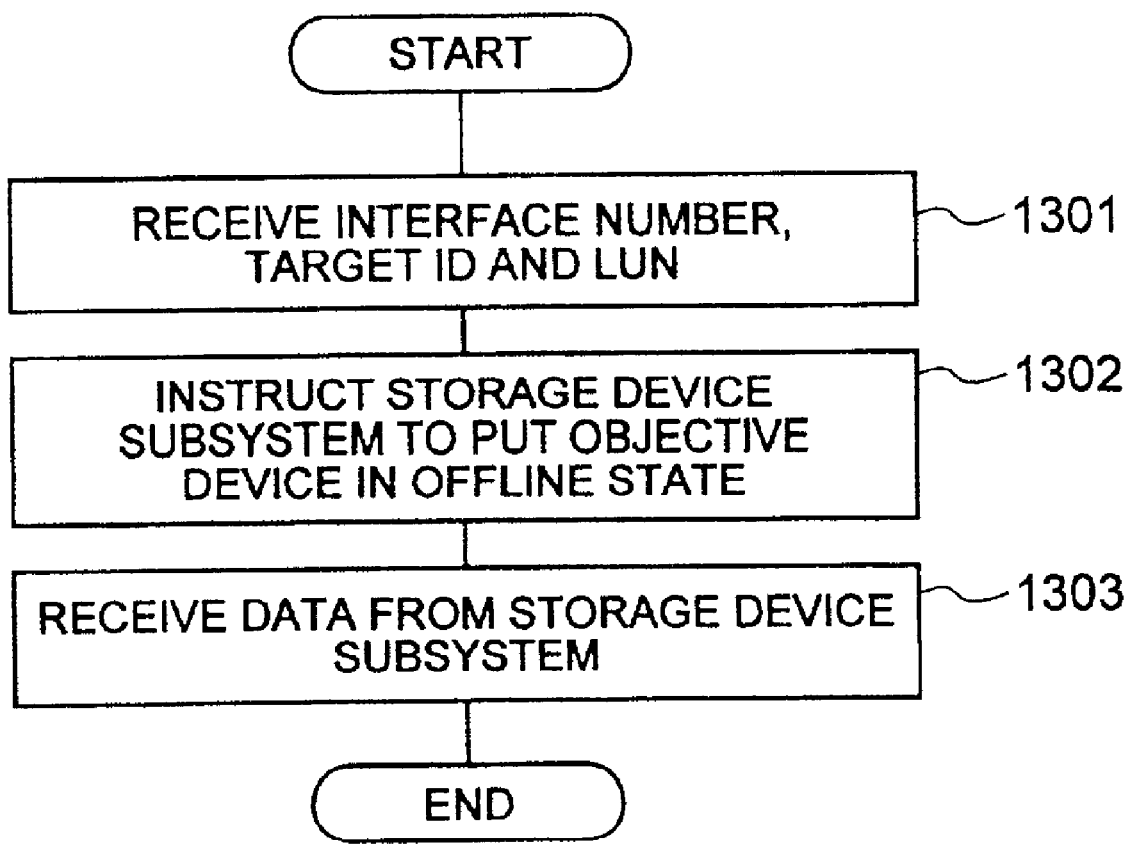
FIG. 7 is a flowchart showing a flow of operations implemented by the control manager in the device returning process.

FIG. 7 is a flowchart showing a flow of operations to be carried out by the control manager 31 in the unnecessary-device returning process of the host computer 1.

The control manager 31 receives the interface number, target ID and LUN from the host computer 1 (step 1301). The control manager 31, on the basis of the received interface number, target ID and LUN, instructs the storage device subsystem 2 to put the device to be returned in its offline state. In response to the instruction, the storage device subsystem 2 puts the specified device in the offline state, and returns the logical device management table reflecting its result to the control manager 31 (step 1302). The control manager 31, when receiving the logical device management table from the storage device subsystem 2, holds it therein and completes its operation (step 1303).

Although the managing host computer is provided and the control manager is positioned therein in the foregoing first embodiment, it is not necessarily required to provide the function of the control manager in the managing host computer. For example, the control manager function may be provided in any of the host computers, 1a, 1b, . . . The control manager function also may be provided in the storage device subsystem. In this case, the host computers 1a, 2b, . . . sends a request and receives its data directly to and from the storage device subsystem via their interfaces.

Figure 8:
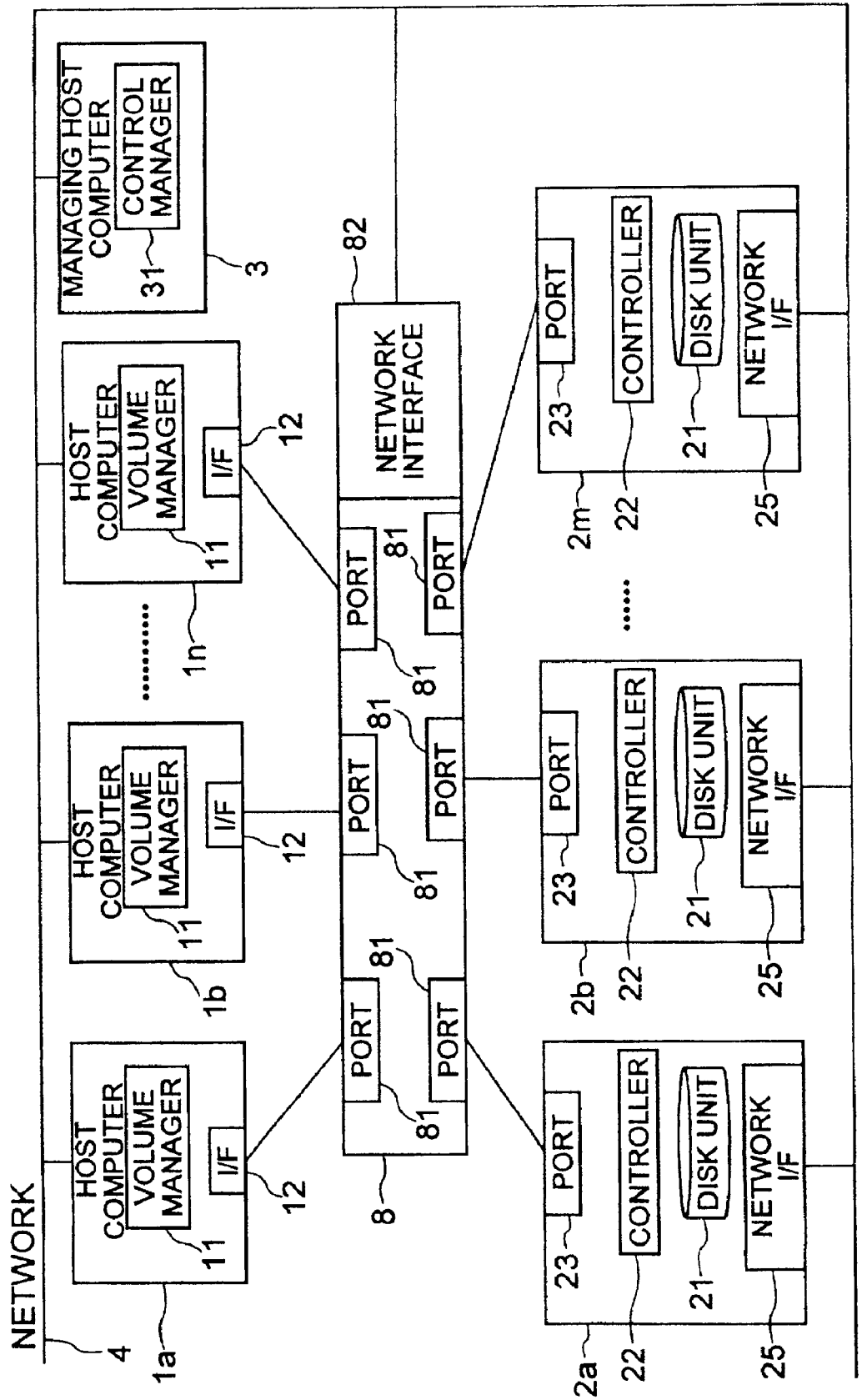
FIG. 8 is a block diagram showing an exemplary arrangement of a computer system in accordance with a second embodiment of the present invention.

FIG. 8 schematically shows an arrangement of a computer system in accordance with a second embodiment of the present invention. The computer system of the present embodiment includes a plurality of host computers 1 (host computers 1a, 2b, . . . , and 1n), a plurality of storage device subsystems 2a, 2b, . . . and 2m, a managing host computer 3, a network 4, and a fibre channel switch 6.

The host computer 1, as in the first embodiment, has a volume manager 11. The volume manager 11 operates to communicate with the control manager 31 provided in the managing host computer 3. Further, each of the host computers 1 has an interface (I/F) 12 which in turn is connected to a fibre channel switch 8 via its interface 12.

Similarly to the storage device subsystem 2 in the first embodiment, each of the storage device subsystems 2a, 2b, ... and 2m includes a disk unit 21, a disk controller 22, a port 23, and a network interface (network I/F) 25 connected to the network. Although a plurality of such disk units 21 and a plurality of such ports 23 may be provided as in the first embodiment, explanation will be made below in connection with the single disk unit and single port, for simplicity.

The fibre channel switch 8 has a plurality of ports 81 which in turn are connected to the associated interfaces 12 of the host computers 1a, 1b, ... and to the associated ports 23 of the storage device subsystems 2a, 2b, ... The fibre channel switch 8 has a network interface 82 which in turn is also connected to the network 4. The fibre channel switch 8 is used so that the host computers 1a, 1b, ... can freely access the storage device subsystems 2a, 2b, ... With this arrangement, all the host computers 1 can access all the storage device subsystems 2.

The managing host computer 3, as in the first embodiment, has a control manager 31 which in turn operates to communicate with the volume managers 11 of the host computers 1a, 1b, ...

FIG. 9 is an exemplary structure of a logical device management table held in the managing host computer 3. The logical device management table in the present embodiment is used for data management, similarly to the logical device management table held by the storage device subsystem 2 in the first embodiment. Explanation will be made as to mainly a difference from the logical device management table of the first embodiment.

In the present embodiment, the managing host computer 3 manages the storage device subsystems 2 by uniquely applying numbers to all the devices possessed by all the storage device subsystems 2. For the purpose of the above management, the logical device management table has data about a size 103, configuration 104, state 105, LUN 106, WWN (World Wide Name) 102, and a connecting host computer name 107 for each device. The size 103, configuration 104, state 105, LUN 106 are the same as those in the logical device management table in the first embodiment. The WWN 102 is data which is set in the port 23 of the storage device subsystem 2 and which is uniquely assigned to each fibre channel interface for identification of each port. The WWN 102 is also called N_PORT_NAME. The connection host computer name 107 is used to identify the host computer which is allowed to be connected to the device in question.

Basically, when the plurality of host computers 1 connected to the fibre channel switch 8 can freely access any of the storage device subsystems 2, it may, in some cases, become a problem from the viewpoint of system security. In order to solve the problem with such system security, for example, JP-A-10-333839 discloses a technique in which only a specific host computer can access a storage device connected therewith by a fibre channel. It is assumed even in the present embodiment that, in order to maintain the system security, the storage device subsystem 2 has such a means for maintaining the security as disclosed in JP-A-333839. However, this is not associated directly with the essence of the present invention and thus detailed explanation thereof will be omitted.

Figure 10:
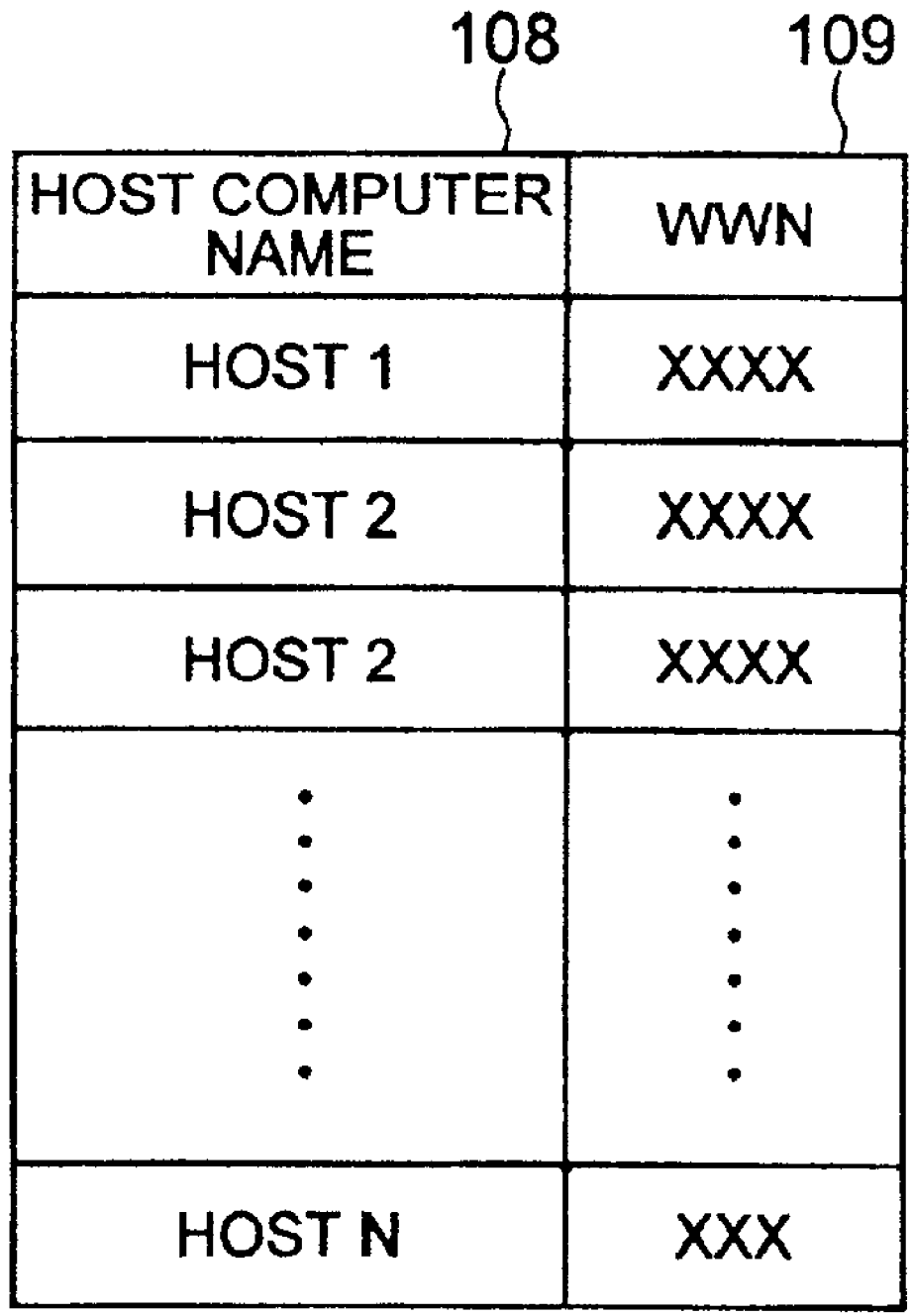
FIG. 10 shows an exemplary structure of a table for management of a correspondence relationship between host computers and WWNs held by the control manager.

In the present embodiment, the WWN 109 is provided even to the interface 12 of each host computer 1. The managing host computer 3, on the basis of such a table as shown in FIG. 10, manages a set of a host computer name 108 and WWN 109.

Explanation will then be made as to the operation of the volume manager 11 and control manager 31.

In the present embodiment, the operation of the volume manager 11 when a new device is assigned to the host computer is basically the same as that in the first embodiment of FIG. 4. More specifically, the volume manager 11, when receiving data on the number and type of the necessary device from the user or application program, requires the control manager 31 to assign the new device thereto on the basis of the received data. After the control manager 31 finishes the assignment of the new device, the volume manager 11 modifies setting of the device such that the host computer 1 can use the new device.

Figure 11:
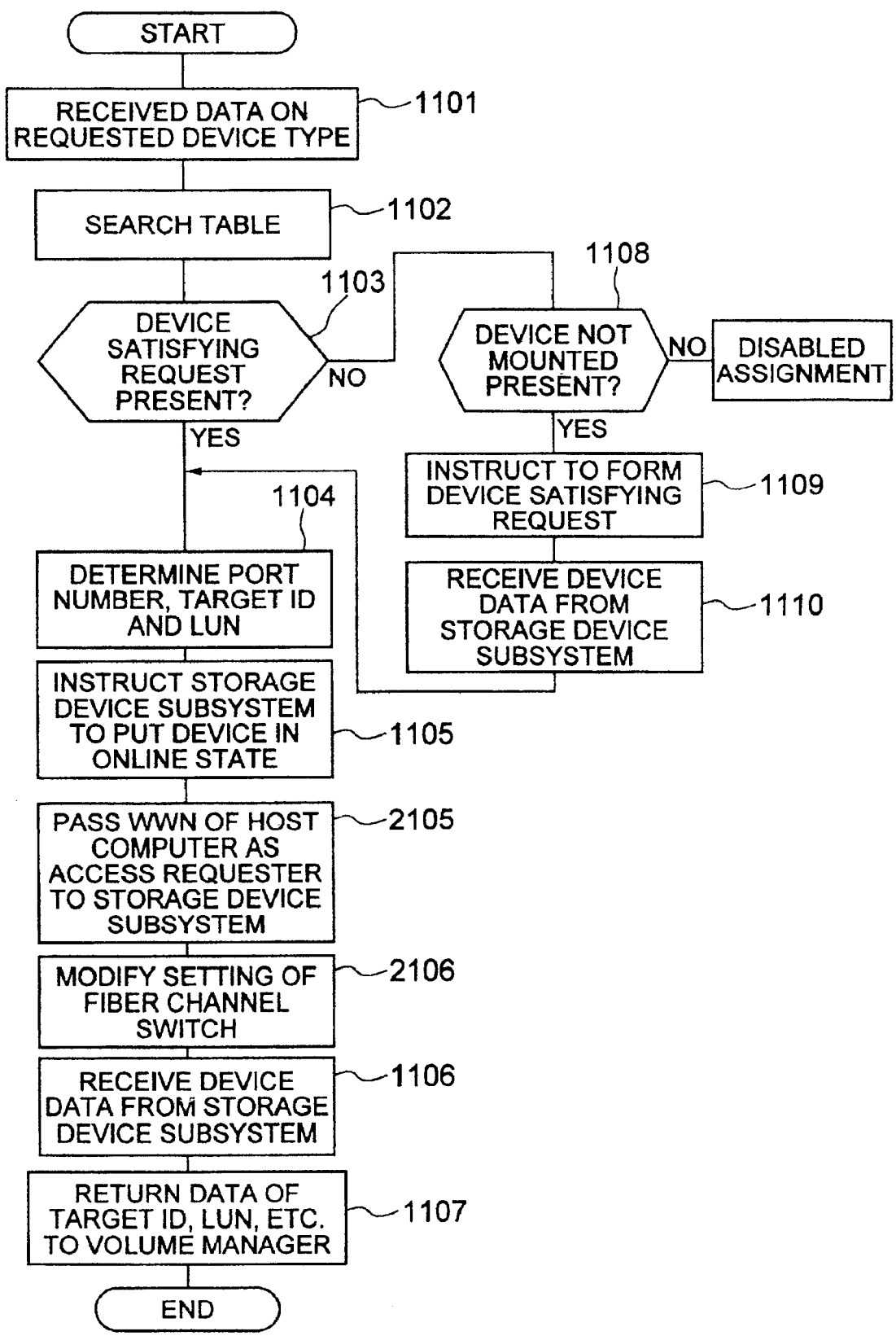
FIG. 11 is a flowchart showing a flow of operations implemented by the control manager.

FIG. 11 shows a flowchart showing a flow of operations carried out by the control manager 31 at the time of the assignment of the new device in the present embodiment. The operations carried out by the control manager 31 are substantially the same as those by the control manager in the first embodiment of FIG. 5. In this connection, parts having substantially the same functions as those in FIG. 5 are denoted by the same reference numbers in FIG. 11. Explanation will be mainly made as to only parts having functions different from those in FIG. 5, and explanation of the parts having the same functions as those in FIG. 5 is omitted.

In the present embodiment, the storage device subsystem 2 disables, in its initial state, access from all the host computers 1 to prevent the device from being accessed by the not-assigned host computers. To this end, the control manager 31, when instructing the storage device subsystem 2 to put the device in its online state at a step 1105, also instructs the storage device subsystem 2 to enable access from the host computer 1 to the device to be newly assigned. In this instruction, the control manager 31 informs the storage device subsystem 2 of the WWN of the host computer 1 to enable the access to the device. The storage device subsystem 2, when the host computer 1 wants to access the device, judges permission or non-permission of the access on the basis of the WWN received from the control manager 31 (step 2105).

Figure 12:
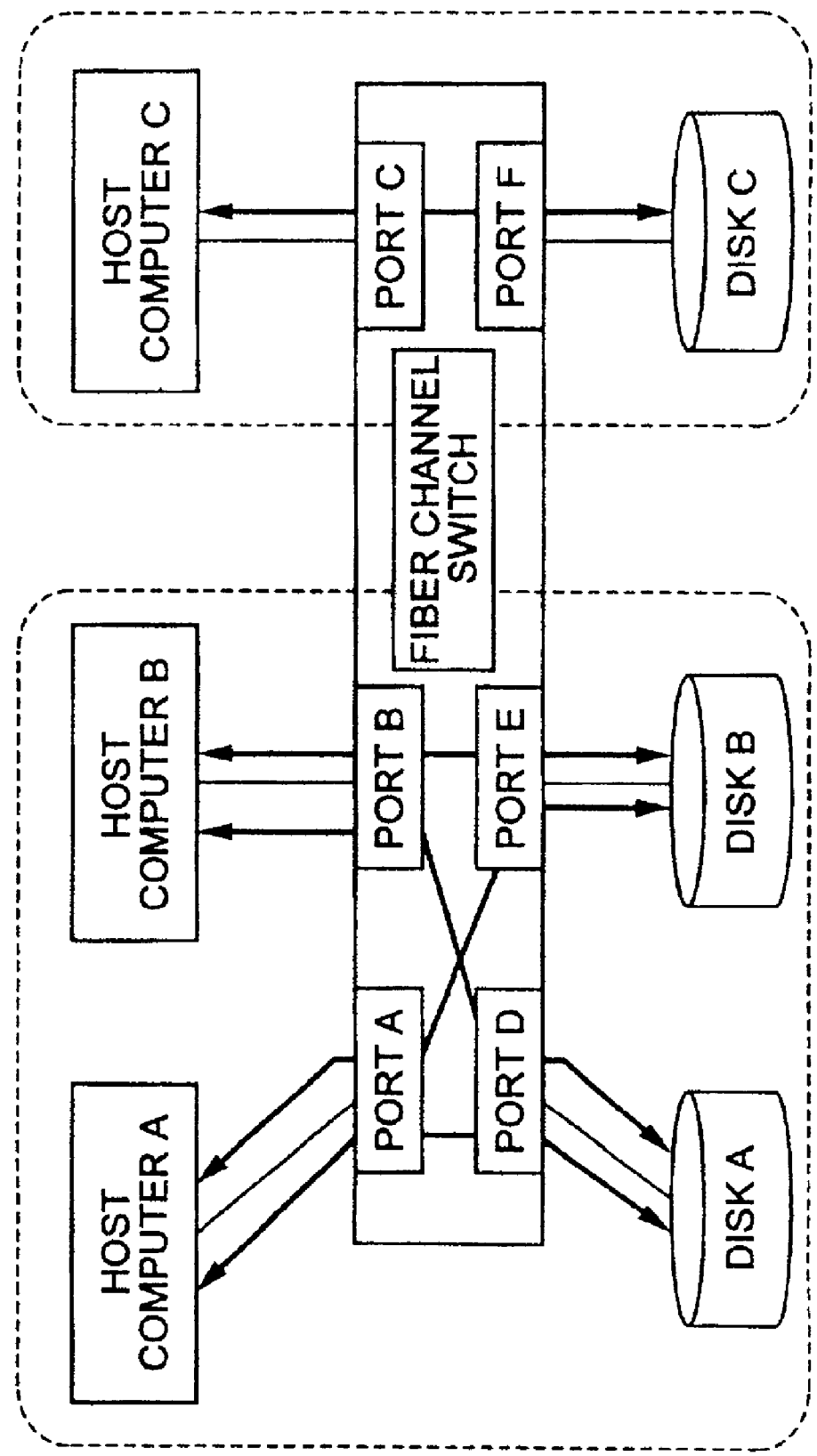
FIG. 12 is a diagram for explaining a zoning function of a fibre channel switch.

After the operation of the step 2105, the control manager 31 modifies the setting of the fibre channel switch 8. Consider, for example, a case where, as shown in FIG. 12, host computers A and B can access disk units (devices) a and b, while a host computer C can access only a disk unit (device) c. In this case, the control manager 31 instructs the fibre channel switch 8 to modify its path setting such that the host computer C cannot access ports d and e connected to the disk units a and b from the port c connected to the host computer C. It can be arranged to look as if there were two switches. Such path setting is called zoning. The zoning can prevent a host computer from accessing a device which should not be accessed from the host computer. Further, since data flows are separated, its performance can be improved (step 2106).

After the above operation, the control manager 31 performs the operations of the steps 1106 and 1107.

Figure 13:
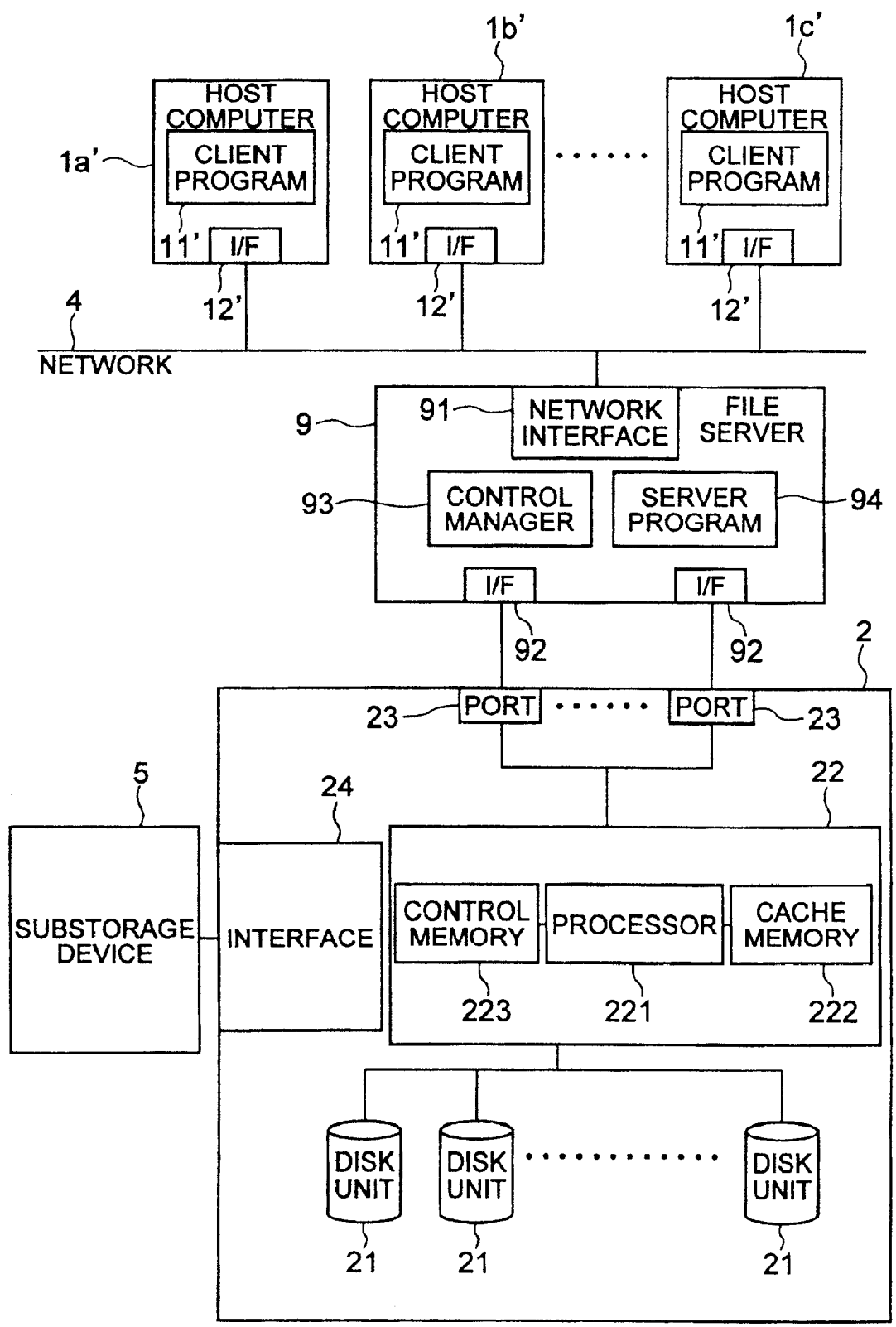
FIG. 13 is a block diagram of an exemplary arrangement of a computer system in accordance with a third embodiment of the present invention.

FIG. 13 schematically shows a block diagram of an exemplary arrangement of a computer system in accordance with a third embodiment of the present invention. In the computer system of the present embodiment, a plurality of host computers 1a', 1b', ... , and 1n' (which are generally referred to as host computer 1') are connected to a file server 9 via interfaces (I/F's) 12' and a network 4. The file server 9 is connected at its interfaces 92(I/F) 92 to the storage device subsystem 2. A storage device subsystem 2 and substorage device 5 as a storage device located at a remote place are substantially the same as those in the first embodiment.

The file server 9 has a network interface 91 connected to the host computers 1', a plurality of interfaces 92 connected to the storage device subsystem 2, a control manager 93 and a server program 94. The control manager 93 performs device assigning operation as required as in the control manager 31 of the first embodiment. The server program 94 is a file server program which offers file access via the network such as NFS (Network File System). The server program 94 offers a means for allowing the host computers 1' to be able to access a file system prepared in the storage device subsystem 2 by the file server 9. Such an NAS (Network Attached Storage) arrangement may be possible that the storage device subsystem 2 and file server 9 cause the host computer 1' to look as if there were a single storage device.

A client program 11' of each of the host computers 1' functions to communicate with the server program 94 of the file server 9 in such a manner that an application program running on the host computer 1' can use the file system prepared in the storage device subsystem 2 by the file server 9. The client program 11' may be built in an operating system (not shown) of the host computer 1' depending on the system configuration. The client program 11' requires the control manager 93 to make a new file system or to modify the size of the existing file system. In order that the host computer 1' can modify the size of the existing file system during run of the computer 1', the storage device subsystem 2 of the present embodiment has a function of moving the data present in a logical device to a physical disk unit different from a physical disk units having the logical device already formed therein. As a specific technique for realizing such a function, such a known technique as, e.g., in U.S. Pat. No. 5,956,750 can be employed. Therefore detailed explanation thereof will be omitted in this specification.

Figure 14:
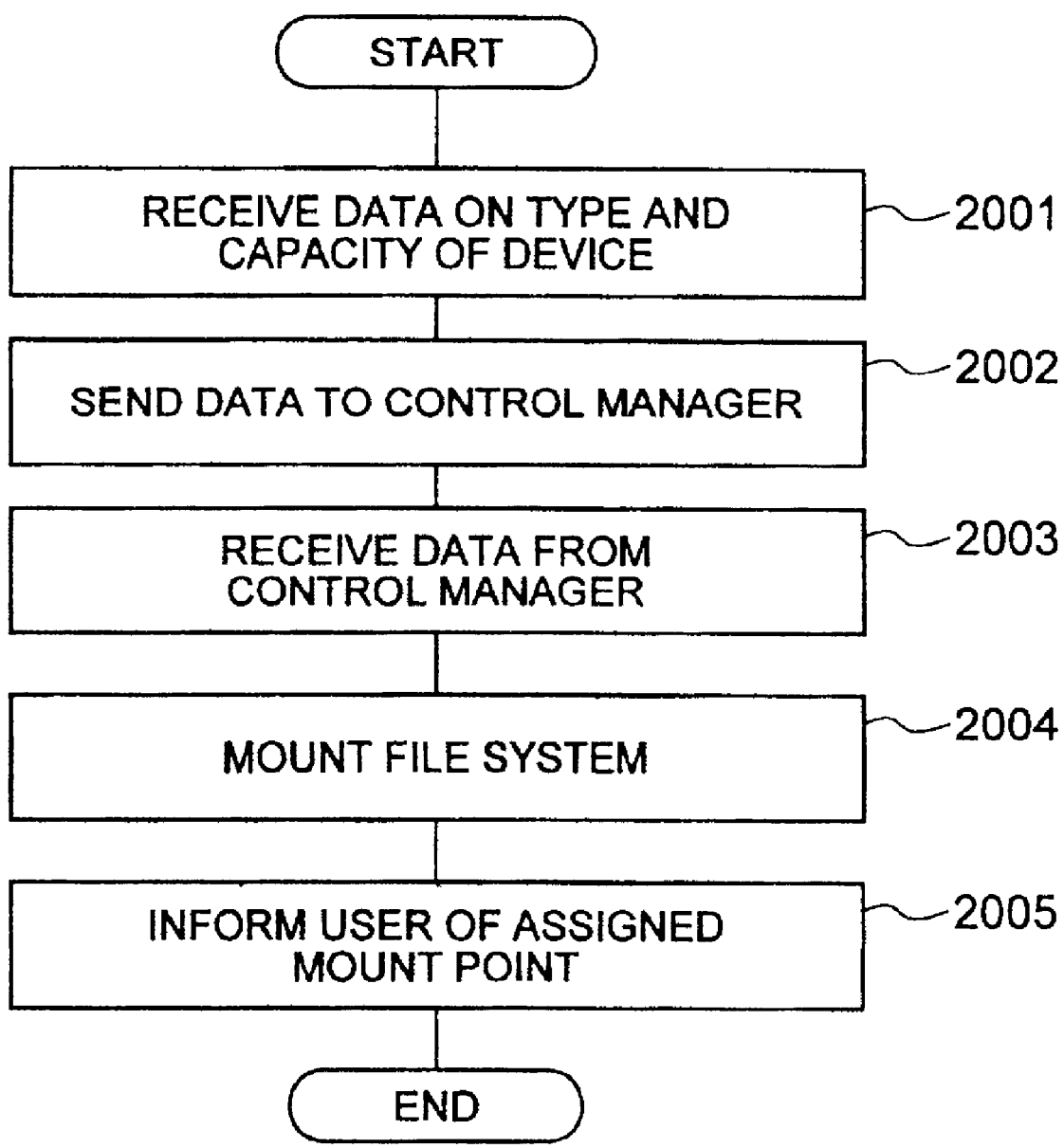
FIG. 14 is a flowchart showing a flow of operations by a client program.

FIG. 14 is a flowchart showing a flow of operations carried out when the client program 11' of the host computer 1' forms a new file system. The operations are carried out when a user using the host computer 1' or an application program running on the host computer 1' requires a new file system area. The client program 11' accepts specification of data about a necessary device according to a request from the user or application program. The accepted data include, as in the step 1001 in the first embodiment of FIG. 4, a capacity, performance conditions and reliability level of the necessary device (step 2001). The client program 11' then transmits the specified capacity, performance conditions and reliability level specified at the step 2001 to the control manager 93 to require the new file system area. The control manager 93, on the basis of the data accepted from the client program 11', searches for and prepares the assignable device area and returns its result to the client program 11'. The then operation of the control manager 93 will be explained later (step 2002). The client program 11' receives a response to the request of the new area from the control manager 93. The response then received includes a mount point such as a host name or host IP address of the file server in the case of NFS, and a directory name (step 2003). The client program 11', on the basis of the data received from the control manager 93, mounts the file system (step 2004). Finally, the client program 11' informs the user or application program of the assigned mount point and terminates its operation (step 2005).

Figure 15:
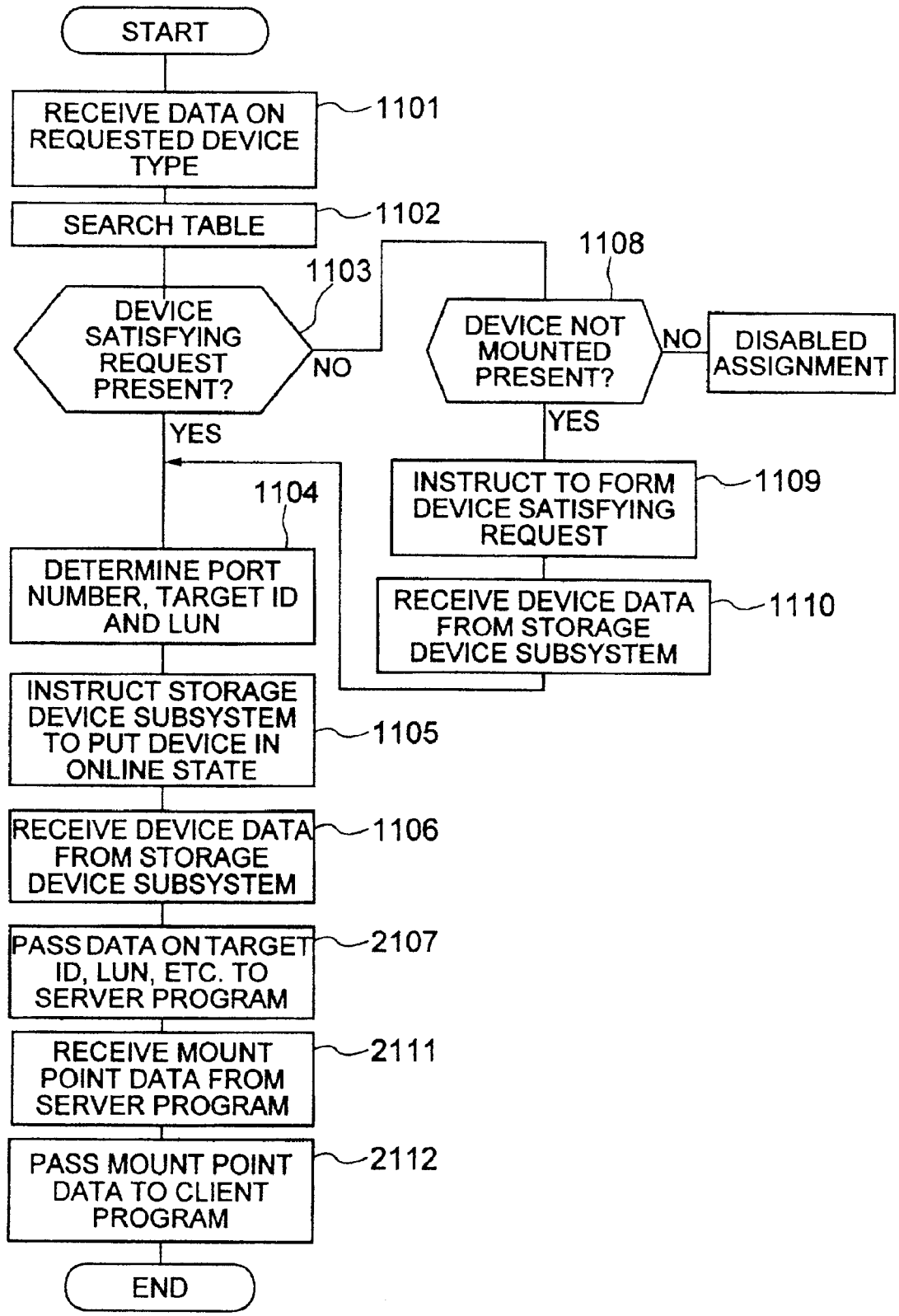
FIG. 15 is a flowchart showing a flow of operations by a control manager of a file server.

FIG. 15 is a flowchart showing a flow of operations carried out by the control manager 93 in response to the request of the new area from the client program 11'. The operations are carried out basically in the same manner as in those of the control manager 31 in the first embodiment of FIG. 5. In this connection, the operation of the step 1107 in FIG. 5 is changed to the operations of steps 2107, 2111 and 2112. Although such data as target ID is passed to the host computer as the request originator at the step 1107 in FIG. 5, such data is processed in the present embodiment. To this end, the control manager 93 passes data about the device such as the target ID to the server program 94 (step 2107), and receives data about the mount point from the server program 94 (step 2111). And the control manager 93 passes the mount point data received from the server program 94 to the client program 11' and then terminates its operation (step 2112).

Figure 16:
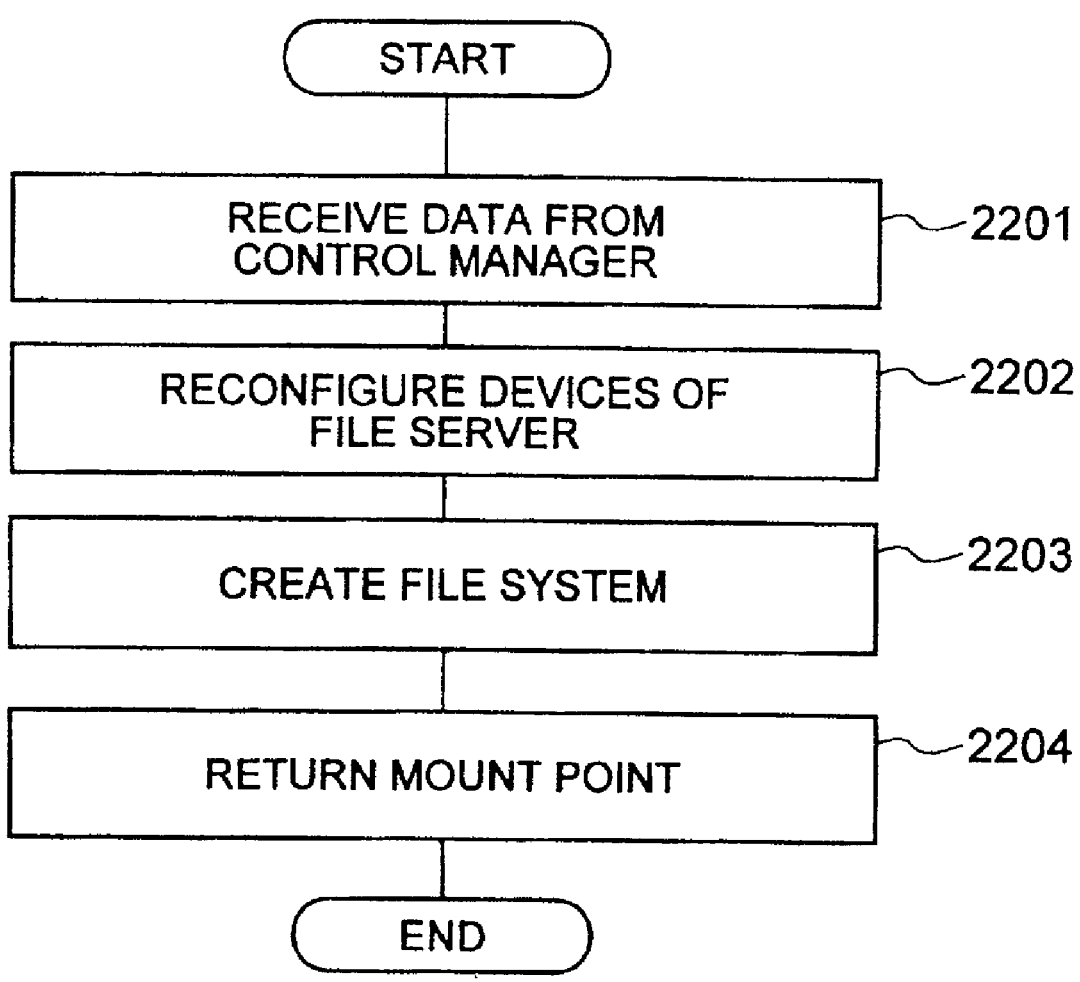
FIG. 16 is a flowchart showing a flow of operations by a server program of file server.

FIG. 16 is a flowchart showing a flow of operations carried out by the server program when receiving the device data from the control manager. The server program 94, when receiving the device data from the control manager 93 (step 2201), performs device reconfiguration operation of the file server 9. More in detail, this operation is substantially the same as that of the step 1005 in the first embodiment of FIG. 4 (step 2202). Subsequently the server program 94 creates a file system in the new device (step 2203), and returns data indicative of the mount point of the file system to the control manager 93 (step 2204).

Through the above operation, there can be added a new file system which can be used by the host computer 1'.

Figure 17:
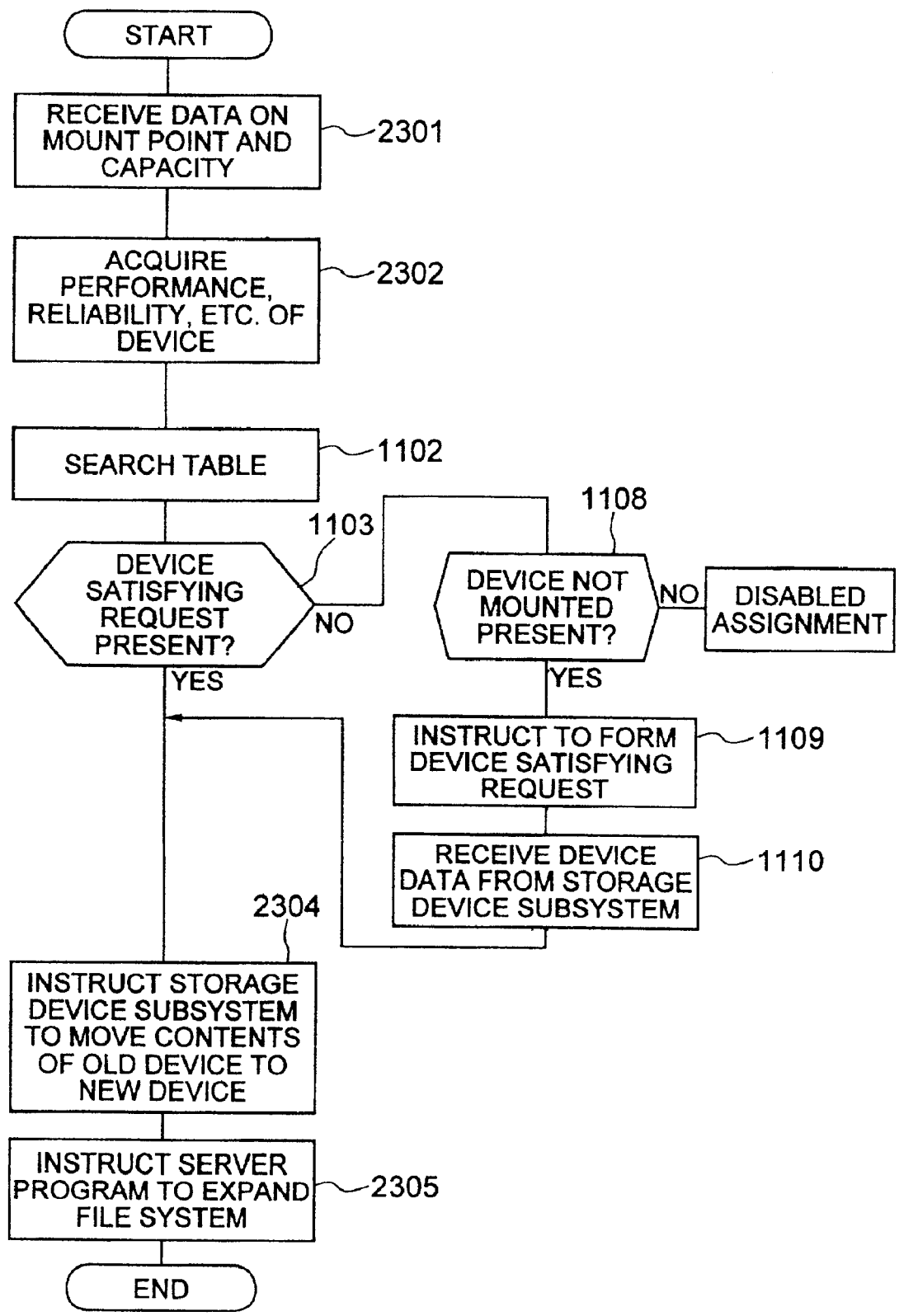
FIG. 17 is a flowchart showing a flow of operations implemented by the control manager when a file system is expanded.

FIG. 17 is a flowchart showing a flow of operations carried out by the control manager 93 at the time of modifying the size of the existing file system. The operation of FIG. 17 is different from the operation of FIG. 15 at the time of requiring a new file system in respects which follow.

When it is desired to modify the size of the existing file system, the user or application program issues a request to the client program 11' containing data such as the mount point of the file system to be modified in its size and the size to be expanded or reduced. The client program 11', using the data specified by the user or application program, requires the control manager 93 to modify the size of the file system. The control manager 93 receives the mount point of the file system to be processed and the size to be expanded, from the client program 11' (step 2301). The control manager 93, on the basis of the mount point received from the client program 11' acquires data about the target ID, LUN, etc. of the logical device storing therein the file system to be processed, to identify the logical device. And the control manager 93 acquires the type of the logical device, that is, data on its reliability, performance, etc. (step 2302). Subsequently, as when a new file system is added, the control manager 93, on the basis of the data acquired at the steps 2301 and 2302, allocates the logical device of the same type as the initial logical device and having the same capacity as the size of the file system after modified (steps 1102 to 1110). Thereafter control manager 93 instructs, at a step 2304, the storage device subsystem 2 to move or transfer the data from the logical device having the file system so far recorded therein to the new secured logical device. The data transfer is carried out transparently from the server program 94. Since the host computer 1' makes access to the storage device subsystem 2 via the server program 94, this operation becomes transparent vent from the host computer 1'. Accordingly, it is unnecessary to stop the operation during the data transfer. After finishing the data transfer, the control manager 93 instructs the server program 94 to expand the file system. Even when the capacity of the device is actually increased, all the capacity of the expanded file system cannot be used so long as the file system is not reformed. The control manager 93, after instructing the server program 94 to expand the file system, informs the client program 11' of completion of the operation and terminates its operation (step 2305).

Through the above operation, the size modification of the existing file system can be realized while the host computer 1' is being run. When it is desired to modify the size of the existing file system, the client program 11', after receiving its notification from the control manager 93, can use the expanded file system as it is. In this case, thus, it is unnecessary to carry out the operations of the steps 2004 and 2005 in FIG. 14.

Figure 18:
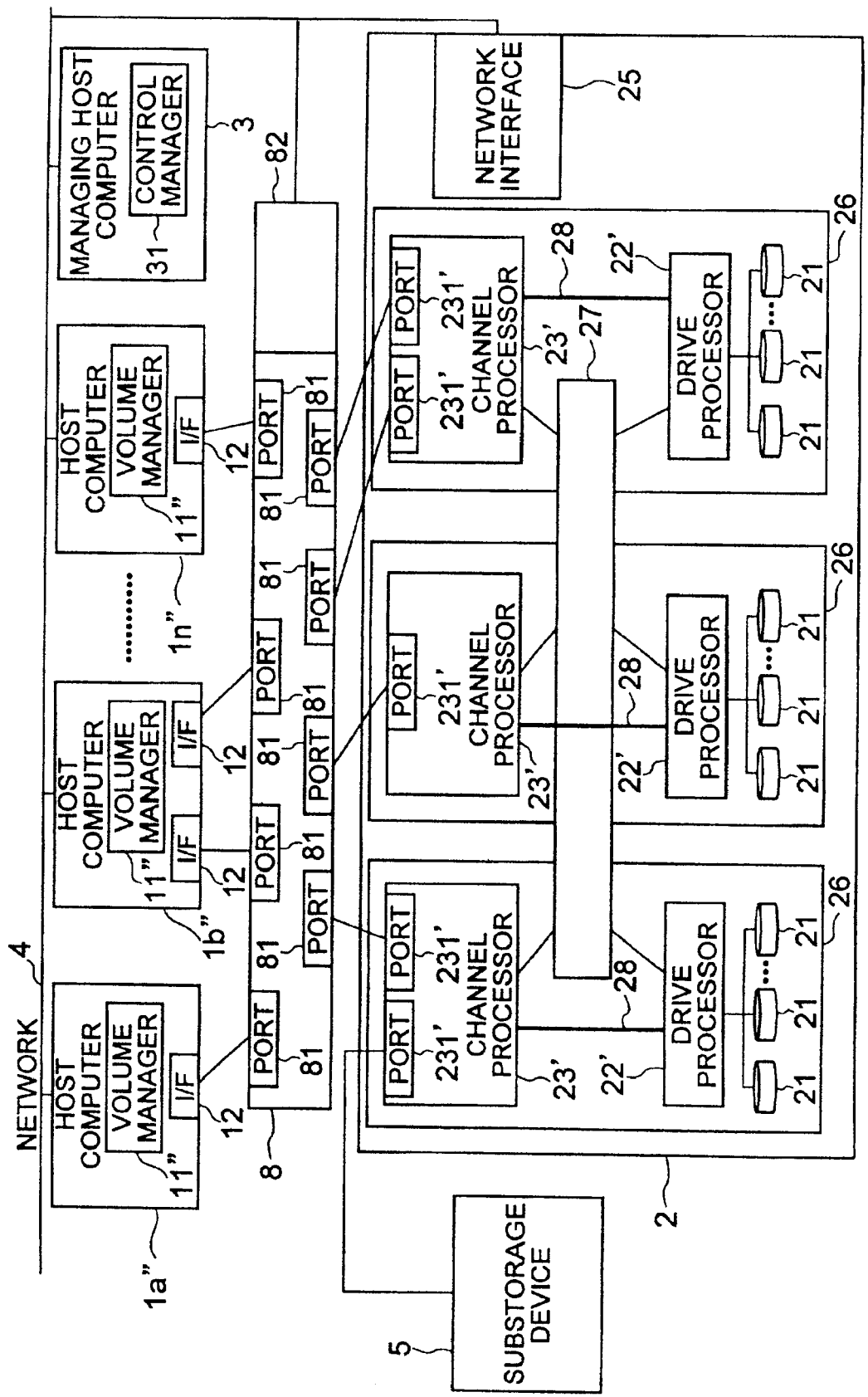
FIG. 18 is a block diagram of an exemplary arrangement of a computer system in accordance with a fourth embodiment of the present invention.

FIG. 18 is a schematic block diagram showing an exemplary arrangement of a computer system in accordance with a fourth embodiment of the present invention. The computer system of the present embodiment includes a plurality of host computers 1" (host computers 1a", 1b", . . . , and 1n"), a managing host computer 3, a storage device subsystem 2', and a substorage device 5. The host computers 1" and storage device subsystem 2' are connected each other by a fibre channel switch 8. The host computers 1", storage device subsystem 2' and fibre channel switch 8 are mutually connected by means of a network 4. The fibre channel switch 8 having a plurality of ports 81 performs switching operation of connections between the ports 81 to realize data transfer to the devices connected thereto. The fibre channel switch 8 also has a network interface 82 for communication via the network 4. Each of the host computers 1" has a volume manager 11" and a single or a plurality of interfaces 12. The interface or interfaces 12 of the host computer 1" are connected to any of the plurality of ports 81 of the fibre channel switch 8.

The storage device subsystem 2' has an intercontroller connecting mechanism 27 which performs interconnection between a plurality of clusters 26. Each of the clusters 26 has a channel processor 23', a drive processor 22', and a plurality of disk units 21. The channel processor 23' and drive processor 22' in the same cluster are coupled with each other by means of a bus 28 higher in data transfer rate than the intercontroller connecting mechanism 27. Each channel processor 23' having a single or a plurality of ports 231 is connected to the substorage device 5 or to the host computers 1" via the fibre channel switch 8. Each drive processor 22' is connected with a plurality of disk units 21. In the present embodiment, these disk units 21 are combined into a single or a plurality of logical devices, or the single disk unit 21 is made up of a single or a plurality of logical devices. In this connection, it is assumed that the single logical device cannot be made of any combination of the disk units 21 included in the plural clusters 26.

The channel processor 23' causes each host computer 1" to look as if there were a single or a plurality of logical devices, and accepts access from each host computer 1". On principle, the channel processor 23' manages logical devices formed by the disk units 21 belonging to the channel processor 23'. This is because communication between the channel processor 23' and drive processor 22' in the same cluster 26 can be made faster than the communication between the clusters. When the channel processor 23' in a given cluster 26 becomes inoperative due to a factor such as a trouble, however, the operation of the channel processor 23' is replaced by the channel processor 23' of another cluster 26. The channel processor 23' identifies the disk units 21 by which the logical device specified by the host computer 1" is formed, and passes its request to the right drive processor 22'. The drive processor 22' interprets the request received from the channel processor 23', generates disk access request to the disk unit 21 of which the logical device is composed, and sends the disk access request to each corresponding disk unit 21.

The host computer 1" has substantially the same structure as the host computer 1 in the first embodiment, but is slightly different therefrom in the function of the volume manager 11" running thereon. The volume manager 11" has a function of, in addition to the function of assigning and returning the logical device by the volume manager 11 in the first embodiment, combining a plurality of logical devices into another logical device so as to cause the upper-level application program recognizes as if the plural logical devices were the single other logical device. The logical device formed by the volume manager 11" will be hereinafter denoted by LVOL to draw a distinction from the logical device managed by the storage device subsystem 2'. The volume manager 11" can combine a plurality of logical devices into a large single LVOL or divide a single logical device into a plurality of areas to cause the application program on the host computer 1" to use these areas as LVOLs. Further, the volume manager 11" can combine the existing LVOL and a new logical device to expand the capacity of the LVOL.

Figure 19:
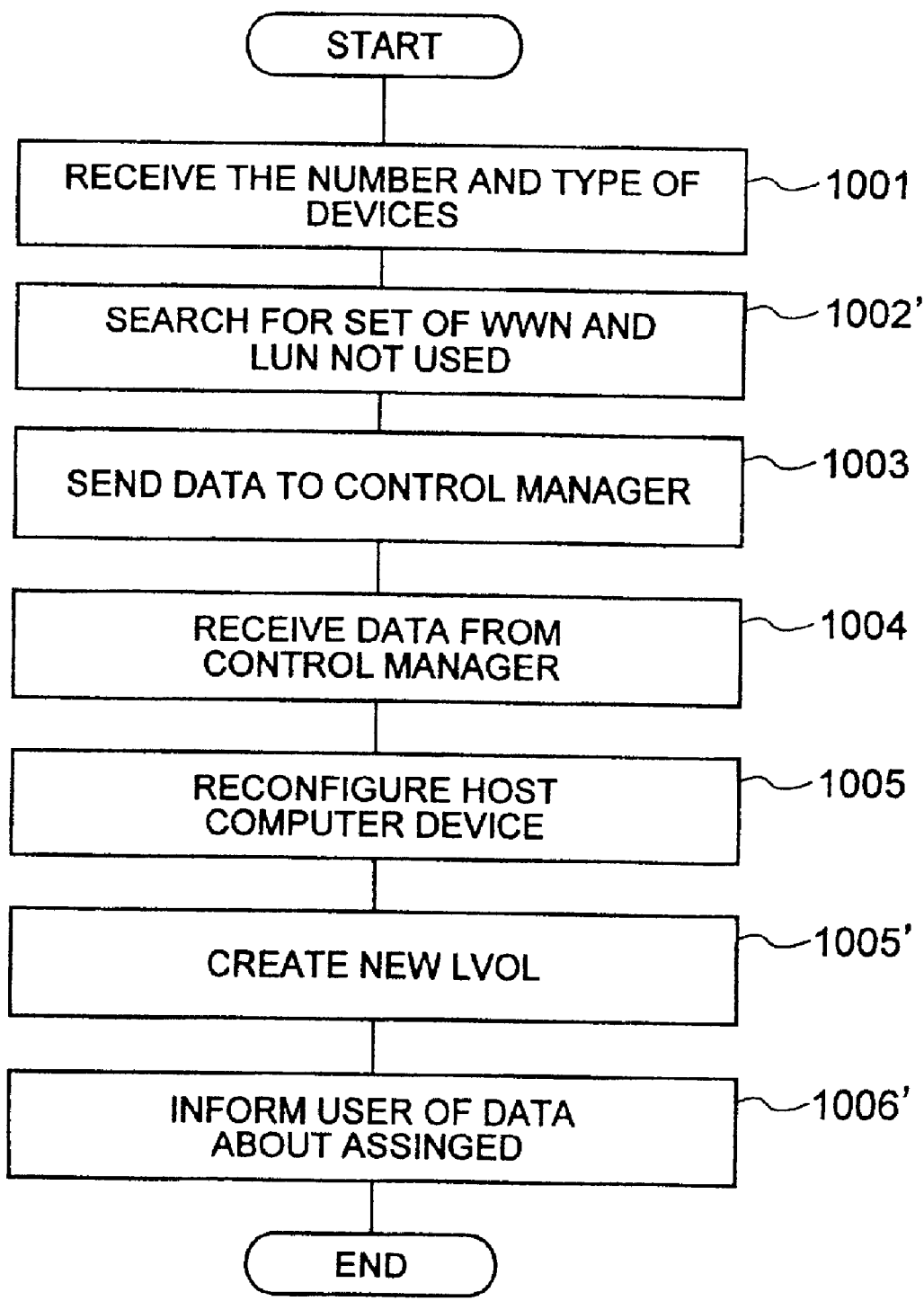
FIG. 19 is a flowchart showing a flow of operations by a volume manager.

FIG. 19 is a flowchart showing a flow of operations carried out by the volume manager 11" when a volume is newly assigned in the present embodiment. The operations to be explained herein correspond to a step 1002' replaced by the step 1002, and steps 1005' and 1006' replaced by the step 1006 in the device assigning operation in the first embodiment of FIG. 4. The other steps are carried out in substantially the same manner as the corresponding steps in FIG. 4. Explanation will be made as to the operations of the steps 1002', 1005' and 1006'.

At the step 1002', the volume manager 11" searches an LVOL management table managed thereby for a set of WWN and LUN not used. An example of the LVOL management table is shown in FIG. 20. Registered in the LVOL management table are data as a set of LVOL name 151, device file name 152, size 153, WWN 154 and LUN 155 for each device. The LVOL name 151 is an identifier for distinction between LVOLs provided to the application program by the volume manager 11". The device file name 152 is the name of the logical device forming an LVOL. The volume manager 11" manages the logical devices belonging to the LVOLs on the basis of the device file name. The size 153 indicates the capacity of each logical device forming an LVOL. Since one LVOL may form a plurality of logical devices, a plurality of device files may belong to one LVOL name.

At the step 1005', the volume manager 11" creates a new LVOL using the logical device assigned by the control manager 31, and registers its contents in the LVOL management table. At the step 1006', the volume manager 11" informs the user of the LVOL name already assigned and terminates its operation.

Figure 21:
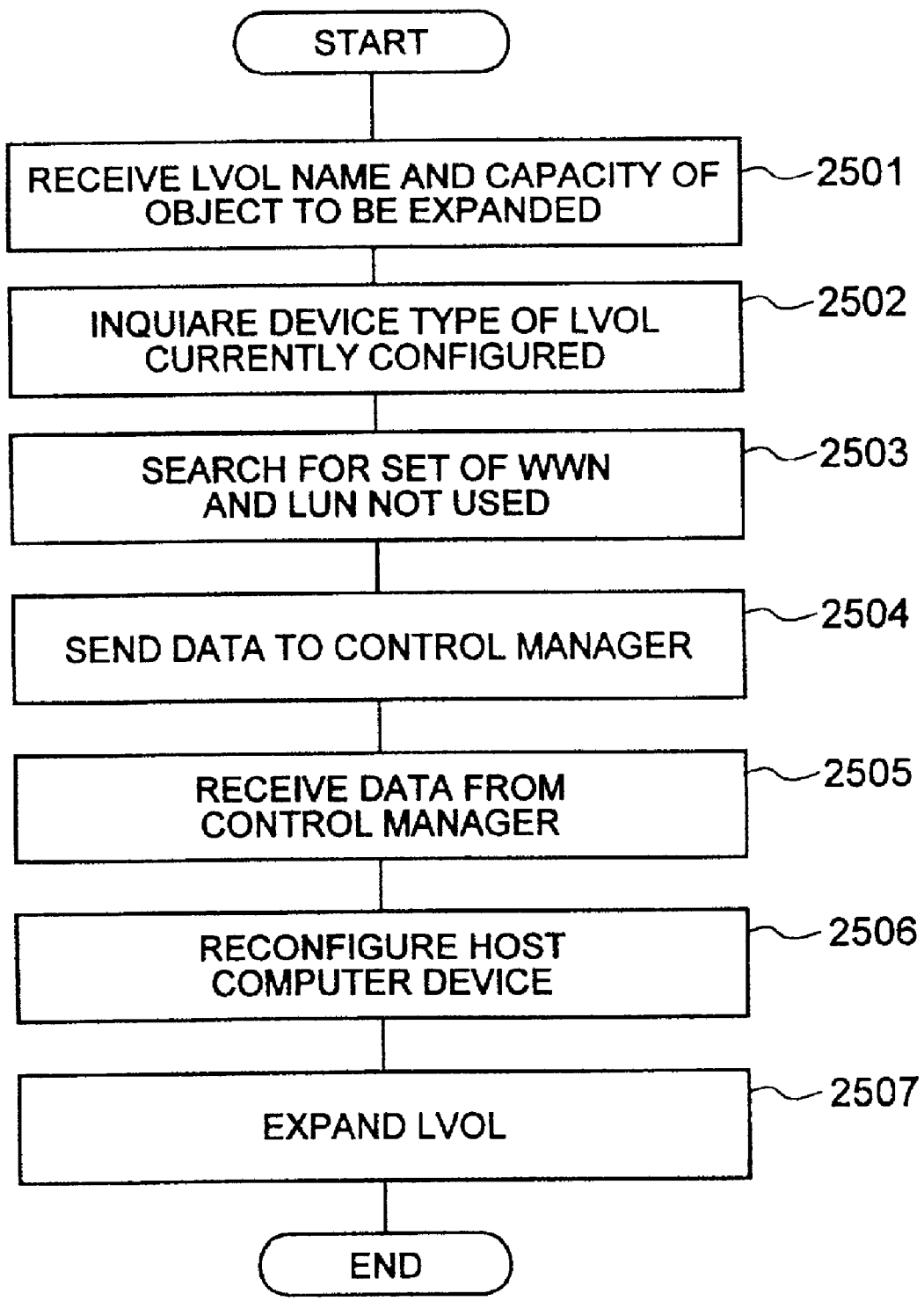
FIG. 21 is a flowchart showing a flow of operations implemented by a volume manager when an LVOL is expanded.

FIG. 21 is a flowchart showing a flow of operations carried out by the volume manager when the capacity of the LVOL is expanded in response to a request from the user or application program. When the capacity of the LVOL is expanded, the volume manager prepares a new logical device, and combine the prepared logical device with the logical device forming the LVOL to be expanded to thereby form a new LVOL. At this time, it is common that the newly prepared logical device of the same type as the logical device forming the LVOL to be expanded. In the present embodiment, the volume manager 11" judges the type of the logical device forming the LVOL to be expanded and allocates the same type of logical device.

In the operation, the volume manager 11" first receives data about the LVOL name of the LVOL to be expanded as well as the capacity to be expanded from the user or application program (step 2501). Next the volume manager 11" inquires the type of the logical device forming the LVOL to be expanded of the control manager 31 (step 2502). The volume manager 11" searches the LVOL management table for a set of WWN and LUN not used (step 2503). The volume manager 11" sends to the control manager 31 the type of the logical device as well as the set of WWN and LUN not used, acquired at the steps 2502 and 2503 (step 3504). The volume manager 11", when receiving the data on the newly assigned logical device from the control manager 31 (step 2505), performs reconfiguring operation of the host computer 1" to allow the host computer 1" to be able to recognize the newly-assigned logical device (step 2506). Finally, the volume manager 11" adds the newly-assigned logical device to the LVOL to be expanded to expand the capacity of the LVOL and terminates its operation (step 2507).

When receiving a request about assignment of a new logical volume from the volume manager 11" at the step 1003 in FIG. 19 and at the step 2504 in FIG. 21, the control manager 31 searches for and assign the type and capacity of the device required by the volume manager 11" in either case. To this end, the control manager 31 has, in addition to such a logical device management table as shown in FIG. 9, a cluster data table having data about the clusters 26 in the storage device subsystem 2' set therein.

FIG. 22 is an exemplary structure of a cluster data management table. The cluster data management table sets therein entries for each cluster 26, that is, a set of cluster number 161 for identification of the cluster, port number 162 of the port having the cluster, and WWN 163 assigned to the port, for each cluster 26. When a plurality of ports are provided to one cluster 26 as illustrated, the respective port numbers and WWNs are set in the corresponding entries of the cluster in question. As already explained above, when a logical device was formed for the disk units 21 connected to the drive processor 22', it is desirable from the performance viewpoint that the port 231 in the same cluster can access the logical device. The control manager 31, on the basis of the cluster data table, sets the devices in such a manner that the port 231 used for access from the host computer 1" and the drive processor 22' connected with the disk unit 21 formed by a logical device to be newly assigned belong to the same cluster.

Figure 23:
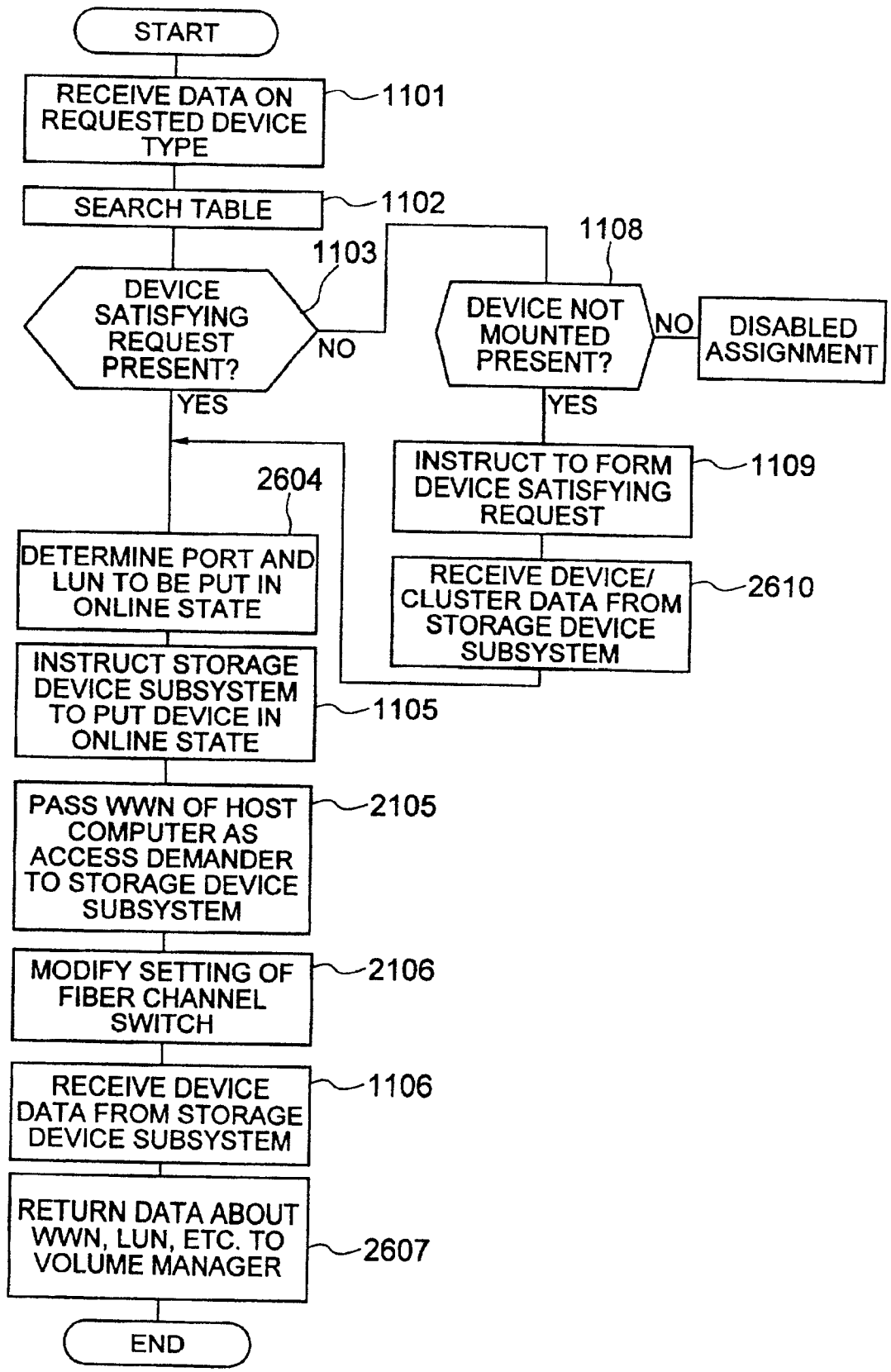
FIG. 23 is a flowchart showing a flow of operations implemented by a control manager when the LVOL is expanded.

FIG. 23 is a flowchart showing a flow of operations in the device assigning process by the control manager 31. The device assigning operations of the present embodiment are carried out in substantially the same manner as those of the second embodiment of FIG. 11, but are partly different from the second embodiment due to a difference in structure between the storage device subsystems. More specifically, when a request to form a new device is issued from the control manager 31 to the storage device subsystem 2' at a step 1109, the storage device subsystem 2' forms a device in response to the request. When the new logical device is formed in the storage device subsystem 2', the control manager 31 receives data indicative of the cluster 26 in which the new logical device was formed therefrom (step 2610). The control manager 31 determines the port from which the new logical device can be accessed by referring to the data on the logical device received from the storage device subsystem 2' and by referring to the cluster data management table. The control manager 31, based on the unused LUN information, further determines the LUN of the device to be newly assigned (step 2604). The control manager 31 finally sends data of WWN, LUN, etc. necessary for access of the logical volume to be newly assigned to the volume manager 11' (step 2607).

Operations other than the operations already explained above are substantially the same as the operations of the control manager in the second embodiment of FIG. 11, and thus detailed explanation of parts having substantially the same function as those in FIG. 11 is omitted.

In accordance with the foregoing embodiments, even when the host computer is operating, the device assigning operation can be carried out in response to its request. Further, even when a plurality of devices configured by the fibre channel switch are mixedly provided, the device satisfying a request from the host computer can be assigned to the host computer.

It should be appreciated that the present intention is not to limit the invention only to the foregoing embodiments shown but rather to include all alterations, modifications and equivalent arrangements possible within the gist and spirit of the invention.

What is claimed is:

1. A computer system comprising:

first computers;

a plurality of storage systems each comprising disks, a disk controller coupled to said disks, and ports communicatively coupled to said first computers; and a second computer communicatively coupled to said plurality of storage systems, wherein said second computer is configured to:

(a) receive a device assignment request for one of said first computers;

(b) prepare a device satisfying the received request out of storage areas in said plurality of storage systems;

(c) set an access permission for an access from said one of said first computers to the prepared device by informing a storage system, within said plurality of storage systems, having the prepared device of an identification associated with said one of said first computers, based on the received device assignment request.

2. A computer system according to claim 1, wherein said second computer is further configured to:

(d) inform said one of said first computers of an identification associated with said prepared device; and wherein said one of said first computers is configured to:

(e) modify a setting of said one of said first computers to make possible to recognize said prepared device on the basis of the received identification.

3. A computer system according to claim 2, further comprising:

a switch coupled to said first computers, said plurality of storage systems, and said second computer, wherein said second computer is further configured to instruct said switch to modify zoning.

4. A computer system according to claim 1, wherein said second computer is configured to select a device satisfying the received request out of devices in said plurality of storage systems to prepare a device for said one of said first computers.

5. A computer system according to claim 1, wherein said second computer is configured to instruct a storage system, within said plurality of storage systems, to configure a new device satisfying the received request, in order to prepared a device for said one of said first computers.

6. A computer system according to claim 1, wherein said second computer is further configured to select a port via which said prepared device is accessed from said one of said first computers.

7. A computer system according to claim 1, wherein said request received by said second computer includes a capacity information of a required device.

8. A computer system according to claim 2, wherein said second computer is further configured to determine an identification associated with said prepared device and inform said one of said first computers of the determined identification.

9. A computer system according to claim 2, wherein said one of said first computers is configured to create a device file for said prepared device to use said prepared device.

10. A method in a computer system, wherein said computer system includes first computers; plurality of storage systems each comprising disks, a disk controller coupled to said disks, and ports communicatively coupled to said first computers; and a second computer communicatively coupled to said plurality of storage systems, the method comprising the steps of:

(a) receiving a device assignment request for one of said first computers at said second computer;

(b) preparing a device satisfying the received request out of storage areas in said plurality of storage systems at said second computer; and (c) setting an access permission for an access from said one of said first computers to the prepared device for a storage system, within said plurality of storage systems having the prepared device by informing said storage system of an identification associated with said one of said first computers from said second computer, based on the received device assignment request.

11. The method according to claim 10, further comprising the steps of:

(d) informing said one of said first computers of an identification associated with said prepared device from said second computer; and (e) modifying a setting of said one of said first computers to make possible to recognize said prepared device on the basis of the received identification at said one of said first computers.

12. The method according to 11, wherein said computer system further comprises a switch coupled to said first computers, said plurality of storage systems, and said second computer, and further comprising the step of instructing said switch to modify zoning from said second computer.

13. The method according to claim 10, wherein said step of preparing a device out of storage areas in said plurality of storage systems comprises the step of selecting a device satisfying the received request out of devices in said a plurality of storage systems at said second computer to prepare a device for said one of said first computers.

14. The method according to claim 10, wherein said step of preparing a device out of storage areas in said plurality of storage systems comprises the step of instructing a storage system to configure a new device satisfying the received request from said second computer, in order to prepared a device for said one of said first computers.

15. The method according to claim 10, further comprising the step of selecting a port via which said prepared device is accessed from said one of said first computers at said second computer.

16. The method according to claim 10, wherein said request received by said second computer includes a capacity information of a required device.

17. The method according to claim 11, further comprising the step of determining an identification associated with said prepared device at said second computer, and wherein said second computer informs said one of said first computers of the determined identification.

18. The method according to claim 11, wherein the step of modifying a setting of said one of said first computers comprises the step of creating a device file for said prepared device to use said prepared device.

* * * * *